(12) United States Patent
Tucker et al.

(10) Patent No.: US 9,772,722 B2
(45) Date of Patent: Sep. 26, 2017

(54) POSITION SENSING METHODS AND DEVICES WITH DYNAMIC GAIN FOR EDGE POSITIONING

(71) Applicant: Parade Technologies, Ltd., Santa Clara, CA (US)

(72) Inventors: Jeffrey David Tucker, Mill Creek, WA (US); Benjamin James Avery, Seattle, WA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 13/928,695

(22) Filed: Jun. 27, 2013

(65) Prior Publication Data
US 2014/0111468 A1 Apr. 24, 2014

Related U.S. Application Data

(60) Provisional application No. 61/716,917, filed on Oct. 22, 2012, provisional application No. 61/776,554, filed on Mar. 11, 2013.

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 3,904,822 A | 9/1975 | Kamm et al. | |
| 5,367,130 A | 11/1994 | Isono | |
| 5,420,379 A | 5/1995 | Zank et al. | |
| 5,543,591 A | 8/1996 | Gillespie et al. | |
| 5,995,084 A | 11/1999 | Chan et al. | |
| 6,011,545 A | 1/2000 | Henderson et al. | |

(Continued)

FOREIGN PATENT DOCUMENTS

| EP | 1256902 A1 | 11/2002 |
|---|---|---|
| EP | 1477889 A2 | 11/2004 |

(Continued)

OTHER PUBLICATIONS

Bahr et al., Ex Parte Schulhauser, Apr. 28, 2016, https://uspto.gov/patents-application-process/appealing-patent-decisions/decisions-and-opinions/precedential, p. 6-8 and 14.*

(Continued)

*Primary Examiner* — Ilana Spar
*Assistant Examiner* — Kirk Hermann
(74) *Attorney, Agent, or Firm* — Morgan, Lewis & Bockius LLP

(57) ABSTRACT

A method can include determining an initial position of an object with respect to a sensing region formed by a plurality of sensors and having a core region bounded by at least one edge; if the initial position is proximate to the edge and a size of the object was previously calculated, determining a final edge position of the object using the previously calculated object size; and if the initial position is proximate to the edge and the size of the object was not previously calculated, determining a size of the object.

14 Claims, 26 Drawing Sheets

(56) References Cited

U.S. PATENT DOCUMENTS

| | | | |
|---|---|---|---|
| 6,323,845 B1 | 11/2001 | Robbins | |
| 6,323,846 B1 | 11/2001 | Westerman et al. | |
| 6,727,892 B1* | 4/2004 | Murphy | G06F 3/04842 |
| | | | 178/18.01 |
| 7,170,468 B2 | 1/2007 | Knopf | |
| 7,663,607 B2 | 2/2010 | Hotelling et al. | |
| 7,800,592 B2 | 9/2010 | Kerr et al. | |
| 7,848,825 B2 | 12/2010 | Wilson et al. | |
| 8,022,940 B2 | 9/2011 | Hung et al. | |
| 8,125,463 B2 | 2/2012 | Hotelling et al. | |
| 8,310,459 B2 | 11/2012 | Nurmi | |
| 8,350,824 B2 | 1/2013 | Hung et al. | |
| 8,358,285 B2 | 1/2013 | Leung et al. | |
| 8,384,675 B2 | 2/2013 | Westerman et al. | |
| 8,405,618 B2 | 3/2013 | Colgate et al. | |
| 8,592,698 B2 | 11/2013 | Hung et al. | |
| 8,638,107 B2 | 1/2014 | Schwartz et al. | |
| 8,704,781 B2 | 4/2014 | Kii | |
| 8,810,543 B1 | 8/2014 | Kurikawa | |
| 2002/0122029 A1* | 9/2002 | Murphy | 345/173 |
| 2006/0097991 A1 | 5/2006 | Hotelling et al. | |
| 2006/0197750 A1 | 9/2006 | Kerr et al. | |
| 2007/0165006 A1* | 7/2007 | Sato et al. | 345/174 |
| 2007/0188474 A1 | 8/2007 | Zaborowski | |
| 2008/0158177 A1 | 7/2008 | Wilson et al. | |
| 2009/0096757 A1 | 4/2009 | Hotelling et al. | |
| 2009/0096758 A1 | 4/2009 | Hotelling et al. | |
| 2009/0174679 A1* | 7/2009 | Westerman | 345/173 |
| 2009/0231288 A1 | 9/2009 | Liao | |
| 2009/0244016 A1 | 10/2009 | Casparian et al. | |
| 2009/0250269 A1 | 10/2009 | Hung et al. | |
| 2009/0251428 A1 | 10/2009 | Hung et al. | |
| 2009/0251429 A1 | 10/2009 | Hung et al. | |
| 2009/0256817 A1 | 10/2009 | Perlin et al. | |
| 2009/0322689 A1 | 12/2009 | Kwong et al. | |
| 2010/0259494 A1 | 10/2010 | Kii | |
| 2010/0259504 A1* | 10/2010 | Doi et al. | 345/174 |
| 2010/0283760 A1 | 11/2010 | Leung et al. | |
| 2011/0018821 A1 | 1/2011 | Kii | |
| 2011/0025636 A1* | 2/2011 | Ryu et al. | 345/173 |
| 2011/0069015 A1 | 3/2011 | Nurmi | |
| 2011/0090155 A1 | 4/2011 | Caskey et al. | |
| 2011/0148435 A1 | 6/2011 | Schwartz et al. | |
| 2011/0254865 A1* | 10/2011 | Yee et al. | 345/661 |
| 2011/0291961 A1* | 12/2011 | Hsieh et al. | 345/173 |
| 2011/0316679 A1* | 12/2011 | Pihlaja | 340/407.2 |
| 2012/0075192 A1* | 3/2012 | Marsden et al. | 345/168 |
| 2012/0084697 A1 | 4/2012 | Reeves | |
| 2012/0206381 A1* | 8/2012 | Pereverzev et al. | 345/173 |
| 2012/0268376 A1 | 10/2012 | Bi | |
| 2012/0313861 A1* | 12/2012 | Sumi et al. | 345/173 |
| 2013/0009900 A1 | 1/2013 | Pryor | |

FOREIGN PATENT DOCUMENTS

| | | |
|---|---|---|
| EP | 1657819 B1 | 2/2013 |
| JP | 6160117 A1 | 3/1986 |
| JP | 3210621 A1 | 9/1991 |
| JP | 6176198 A1 | 6/1994 |
| JP | 9146686 A1 | 6/1997 |
| WO | 2012172364 A2 | 12/2012 |
| WO | WO2013120071 A1 * | 2/2013 |

OTHER PUBLICATIONS

International Search Report for International Application No. PCT/US13/65758 dated Nov. 27, 2013; 2 pages.

Written Opinion of the International Searching Authority for International Application No. PCT/US13/65758 dated Nov. 27, 2013; 12 pages.

Cypress Semiconductor Corporation, International Preliminary Report on Patentability, PCT/US2013/065758, 13 pgs.

"Intuos4 Pen Table 1 Wacom Americas," Copyright 2011 Wacom, downloaded from http://www.wacom.com/en/Products/Intuos.aspx on Jun. 29, 2011, 3 pgs.

Kurikawa, Final Office Action, U.S. Appl. No. 13/072,634, filed Mar. 12, 2014, 12 pgs.

Kurikawa, Final Office Action, U.S. Appl. No. 13/072,634, filed May 23, 2013, 11 pgs.

Kurikawa, Notice of Allowance, U.S. Appl. No. 13/072,634, filed Jun. 20, 2014, 8 pgs.

Kurikawa, Office Action, U.S. Appl. No. 13/072,634, filed Oct. 10, 2013, 12 pgs.

Kurikawa, Office Action, U.S. Appl. No. 13/072,634, filed Feb. 27, 2013, 13 pgs.

Kurikawa, Office Action, U.S. Appl. No. 14/463,240, filed Aug. 27, 2015, 14 pgs.

Kurikawa, Notice of Allowance, U.S. Appl. No. 14/463,240, filed May 18, 2016, 9 pgs.

Tevfik Metin Sezgin and Randall Davis, MIT Computer Science and Artificial Intelligence Laboratory, Cambridge, MA, "Scale-space Based Feature Point Detection for Digital Ink," Copyright 2004, downloaded from http://rationale.csail.mit/edu/publications/Sezgin2004Scalespace.pdf on Jun. 29, 2011, 7 pgs.

"Wacom Intuos3 6 × 8-Inch Pen Tablet," downloaded from http://www.amazon.com/Wacom-Intuos3-8-Inch-Pen-Tablet/dp/B00030097G on Jun. 29, 2011, 3 pgs.

* cited by examiner

C = Centroid
Axy = Adjacent Sensor
Bz = Below Sensor
Gw = Ghost Sensor (extrapolated data)

A11 + A21 = B1 + G1

POSITION CORNER

```
{
    if (xLocalMax == (CDC_txNum - 1) )  MatrixMirrorHorizontal (centroid);    ⎫ 1074-0
    if (yLocalMax == (CDC_rxNum - 1) )  MatrixMirrorVertical (centroid);      ⎭

Position_Edge_Outer (centroid);                                           ⎫
    StoreGrid ();                                                             ⎪
    Clear_Area ();                                                            ⎬ 1074-1
    MatrixMirrorDiagonal (centroid);                                          ⎪
    Position_Edge_Outer (centroid);                                           ⎪
    MatrixMirrorDiagonal (centroid);                                          ⎭

RecallGrid ();                                                            ⎫
    if (xLocalMax == (CDC_txNum - 1) )  MatrixMirrorHorizontal (centroid);    ⎬ 1074-2
    if (yLocalMax == (CDC_rxNum - 1) )  MatrixMirrorVertical (centroid);      ⎭

MatrixMirrorDiagonal (centroid);                                          ⎫
    yPos = Position_COM_Calc (centroid, along y);                             ⎪
    MatrixMirrorDiagonal (centroid);                                          ⎬ 1074-3
    xPos = Position_COM_Calc (centroid, along x);                             ⎭
}
```

FIG. 10

POSITION_COM  ⤶ 1200

```
{
    if (yLocalMax == 0 || yLocalMax = (CDC_rxNum - 1) )
    {
        xPos = Position_COM_Calc (centroid, along x);
        if (xLocalMax == 1 )      Clear_Area (left);
        else                      Clear_Area (right);
        MatrixMirrorDiagonal (centroid);
        yPos = Position_COM_Calc (centroid, along y);
        MatrixMirrorDiagonal (centroid);
    }
    else if (xLocalMax == 0 || xLocalMax > (CDC_txNum -1) )
    {
        MatrixMirrorDiagonal (centroid);
        yPos = Position_COM_Calc (centroid, along y);
        MatrixMirrorDiagonal (centroid);

if (xLocalMax == 0 )      Clear_Area (top);
        else                      Clear_Area (bottom);
        xPos = Position_COM_Calc (centroid, along x);
    }
    else
    {
        MatrixMirrorDiagonal (centroid);
        yPos = Position_COM_Calc (centroid, along y);
        MatrixMirrorDiagonal (centroid);

xPos = Position_COM_Calc (centroid, along x);
    }
}
```

1274-0 (first block)
1274-1 (second block)
1274-2 (third block)

FIG. 12

Eq. 1  $m = \dfrac{(f1-f2) * 2^{16}}{z1-z2}$

Eq. 2  $b = f1 - \dfrac{(m*z1)}{2^{16}}$

Eq. 5  $FingerSize = \dfrac{(m*zSum)}{2^{16}} + b$

FIG. 13A

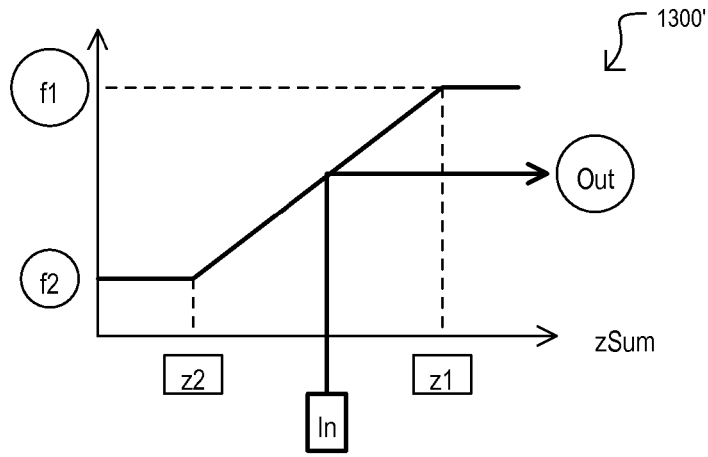

FIG. 13B-0

DetectFingerSize_Core

```
f1 = MAX_FINGER_OPTIMIZATION;;
f2 = MIN_FINGER_OPTIMIZATION;
z1 = DesignData[4];
z2 = DesignData[3];

m = ((f1-f2)<<16)/(z1-z2);
b = f1 - ((m*z1)>>16);

zSum = centroid[1][1] + centroid[1][2] + centroid [1][3] +
       centroid[2][1] + centroid[2][2] + centroid [2][3] +
       centroid[3][1] + centroid[3][2] + centroid [3][3];

tmp = ((m*zMag)>>16) + b;

if(tmp > f1)  tmp = f1;
if(tmp < f2)  tmp = f2;
return  tmp<<4
```

FIG. 13B-1

Eq. 3    $m = \dfrac{(f1-f2) * 2^{16}}{\dfrac{z1-z2}{2}}$

Eq. 4    $b = f1 - \dfrac{(m*z1)}{2^{16}}$

Eq. 5    $FingerSize = \dfrac{(m*zSum)}{2^{16}} + b$

FIG. 14A

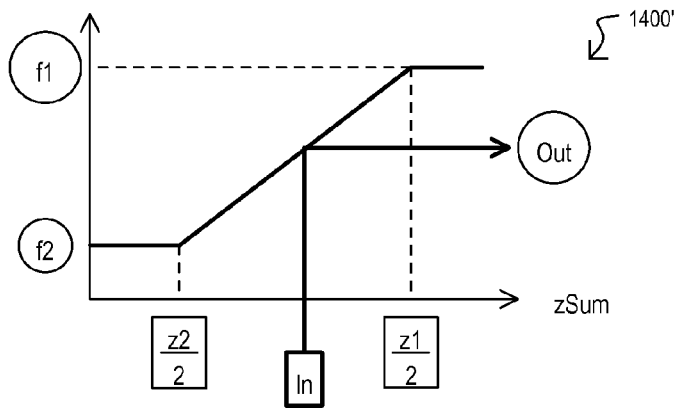

FIG. 14B-0

DetectFingerSize_Edge

```
f1 = MAX_FINGER_OPTIMIZATION;;
f2 = MIN_FINGER_OPTIMIZATION;
z1 = DesignData[4];
z2 = DesignData[3];
z1 = z1>>1;
z2 = z2>>1;

m = ((f1-f2)<<6)/(z1-z2);
b = f1 - ((m*z1)>>16);

zSum = centroid[1][1] + centroid[1][2] + centroid [1][3] +
       centroid[2][1] + centroid[2][2] + centroid [2][3] +
       centroid[3][1] + centroid[3][2] + centroid [3][3];

tmp = ((m*zMag)>>16) + b;

if(tmp > f1) tmp = f1;
if(tmp < f2) tmp = f2;
return tmp<<4
```

DetectFingerSize_Corner

```
f1 = MAX_FINGER_OPTIMIZATION;;
f2 = MIN_FINGER_OPTIMIZATION;
z1 = DesignData[4];
z2 = DesignData[3];

zSum = centroid[1][1]  +  centroid[1][2]  +  centroid [1][3]  +
       centroid[2][1]  +  centroid[2][2]  +  centroid [2][3]  +
       centroid[3][1]  +  centroid[3][2]  +  centroid [3][3];

tmp = 5;
if(zMag > z2)  tmp = 7;
return  tmp<<4 ;
```

Position_Edge_Outer                                      1600

Eq. 6   $\text{FingerScale} = \dfrac{(FS * 2^{SCALAR\_SHIFT})}{(2^{FS\_SHIFT} * MIN\_FINGER\_OPTIMIZATION)}$ Eq. 7   $\text{HighPivot} = \dfrac{\text{HighPivot} * \text{FingerScale}}{2^{SCALAR\_SHIFT}}$ Eq. 8   $\text{LowPivot} = \dfrac{\text{LowPivot} * \text{FingerScale}}{2^{SCALAR\_SHIFT}}$ Eq. 9   $\text{ScalarRange} = 2 * 2^{SCALAR\_SHIFT} - \text{FingerScale}$ Eq. 10  $\text{Scalar} = 2^{SCALAR\_SHIFT} - \max\left( \dfrac{\sqrt{\max(zSum-LowPivot, 0) * 2^{SQRT\_SHIFT}} * \text{ScalarRange}}{\sqrt{(HighPivot - LowPivot) * 2^{SQRT\_SHIFT}}}, 2^{SCALAR\_SHIFT} \right)$ Eq. 11  $\text{centroid}[1][j] = \dfrac{\text{centroid}[2][j] * \text{outergain} * \text{Scalar}}{2^{GAIN\_SHIFT} * 2^{SCALAR\_SHIFT}}$ Eq. 12  $\text{centroid}[0][j] = \dfrac{\text{centroid}[1][j] * \text{innergain}}{2^{GAIN\_SHIFT}}$

FIG. 16A

Position_Edge_Outer                                      1600'

```
{
    FingerScale = ((FS<<SCALAR_SHIFT)>>FS_SHIFT)/MIN_FINGER_OPTIMIZATION;
    ScalarRange = (2<<SCALAR_SHIFT) - FingerScale;                              } 1674-0
    HighPivot = (HighPivot*FingerScale) >> SCALAR_SHIFT;
    LowPivot = (LowPivot*FingerScale) >> SCALAR_SHIFT;

if (CornerFlag == 1) HighPivot = (HighPivot*3)>>2;                          } 1674-1
    if (CornerFlag == 1) LowPivot = (LowPivot*3)>>2;

zSum = Position_zMeasure( (int32 (*) [5]) centroid , 1);

if (zSum < LowPivot)        tmp = 0;                                        } 1674-2
    else if(zSum > HighPivot)   tmp = SqrtUint32 (((HighPivot-LowPivot) << SQRT_SHIFT) );
    else                        tmp = SqrtUint32 (((zSum-LowPivot) << SQRT_SHIFT) );

Scalar = (1 << SCALAR_SHIFT) - ( (tmp*ScalarRange) / SqrtUint32((HighPivot-LowPivot) << SQRT_SHIFT) );  } 1674-3

/* Loop through each element and generate VS */
    for (j = 0; j < 5; j++)
    {
        if( centroid[3][j] > s1_Offset)     s1 = centroid[3][j] - s1_Offset;
        else                                s1 = 0;                             } 1674-4 tmp = (centroid[2][j] * innergain) >> (GAIN_SHIFT);
        centroid[l][j] = ((centroid[2][j] - s1) * Scalar * outergain) >> (SCALAR_SHIFT+GAIN_SHIFT);
        if( tmp > centroid[1][j])   centroid[1][j] = tmp;
        centroid[0][j] = (centroid[l][j] * innergain)>>(GAIN_SHIFT);
    }
}
```

FIG. 16B

Position_Edge_Inner $$\text{centroid}[0][j] = \frac{\text{centroid}[1][j]*\text{innergain}}{2^{GAIN\_SHIFT}}$$

FIG. 17A

Position_Edge_Inner

```
{
    /* Loop through each element and generate VS */
    for (j = 0; j < 5; j++)
    {
        centroid[0][j] = (centroid[1][j] * innergain)>>(GAIN_SHIFT);
    }
}
```

FIG. 17B

Position_COM_Calc $$\text{WeightedSum} = \sum_{i=0}^{4} \sum_{j=0}^{4} (i-2) * \text{centroid}[i][j]$$

$$\text{TotalSum} = \sum_{i=0}^{4} \sum_{j=0}^{4} \text{centroid}[i][j]$$

$$\text{ucRes} = \frac{\text{Resolution}}{\text{SensorNum}} * 2^{\text{RES\_SHIFT}}$$

$$\text{Pos} = \frac{\left(\dfrac{\text{WeightedSum} * 2^{\text{COM\_SHIFT}}}{\text{TotalSum}} + \text{LocalMax} * 2^{\text{COM\_SHIFT}} + 2^{\text{COM\_SHIFT}-1}\right) * \text{ucRes}}{\text{RES\_SHIFT} + \text{COM\_SHIFT}}$$

FIG. 18A

Position_COM_Calc

```
{
    TotalSum = 0;
    WeightedSum = 0;
    for ( j=0; j<5; j++)
    {
        for (n = 0; n<5; n++)
        {
            TotalSum += centroid[n][j];
            WeightedSum += centroid[n][j] * (n-2);
        }
    }
    Pos = (WeightedSum << COM_SHIFT) / TotalSum + (LocalMax << COM_SHIFT) +
        (I<<COM_SHIFT-1));
    Pos = (Pos * ucRes) >> (RES_SHIFT+COM_SHIFT);
    return Pos;
}
```

FIG. 18B

MATRIX MIRROR HORIZONTAL

MATRIX MIRROR VERTICAL

POSITION SENSING METHODS AND DEVICES WITH DYNAMIC GAIN FOR EDGE POSITIONING

This application claims the benefit of U.S. provisional patent applications having Ser. No. 61/716,917, filed on Oct. 22, 2012, and Ser. No. 61/776,554, filed on Mar. 11, 2013, the contents of both of which are incorporated by reference herein.

TECHNICAL FIELD

The present disclosure relates generally to proximity sensing systems, including touch sensing systems, and more particularly to capacitance proximity/touch sensing systems and methods.

BACKGROUND

In object sensing systems, including but not limited to touch capacitance sensing systems, linearity and accuracy are desirable responses. Accuracy can be the difference between an actual object position (e.g., finger touch location) and a location reported to a system (e.g., location on a touch display). Linearity can be the straightness of a linear path over sensor region (e.g., line drawn on a panel surface).

Conventionally, object sensing systems can have reduced linearity and accuracy at the edges of a sensing area (including corners). In some conventional approaches, a "curvature" of a sensing signal (caused by the object passing off the edge) was determined, and then compensated for when an object was at an edge location. Such compensation could include generating values for "virtual sensors" corresponding to regions beyond the edge.

A drawback to such conventional approaches can arise when sensed objects vary in shape. In particular, in capacitance sensing touch systems, contacting finger shapes may vary (i.e., can be various oval shapes), while tested shapes (used to compensate for curvature) can have a uniform shape (i.e., be circular). Further, such conventional approaches can constantly determine finger size and or shape while determining position. At edge locations, it can be difficult to accurately determine finger size. Consequently, a touch response can exhibit a "scalloping" response at edge locations (poor linearity) and/or jumps in finger size, which can result in poor accuracy.

BRIEF DESCRIPTION OF THE DRAWINGS

FIGS. 5A-0 to 5A-4 are diagrams showing the generation and variation of virtual sensor values according to finger size.

FIGS. 5B-0 to 5B-3 are diagrams showing the generation of virtual sensor values having a dynamic gain according to finger size.

FIG. 10 is a code representation of a function for generating a final position of an object at a corner location, according to an embodiment.

FIG. 12 is a code representation of a function for calculating a final position of an object at edge and core locations, according to an embodiment.

FIGS. 13A to 13B-1 are diagrams showing a finger size calculation for an object at a core location that can be included in embodiments.

FIGS. 14A to 14B-1 are diagrams showing a finger size calculation for an object at an edge location that can be included in embodiments.

FIGS. 16A and 16B are diagrams showing functions for populating virtual sensor values for an object at a first edge location, according to very particular embodiments.

FIGS. 17A and 17B are diagrams showing functions for populating virtual sensor values for an object at a second edge location, according to very particular embodiments.

FIGS. 18A and 18B are diagrams showing functions for calculating a final finger position that can be included in embodiments.

DETAILED DESCRIPTION

Figure 1:
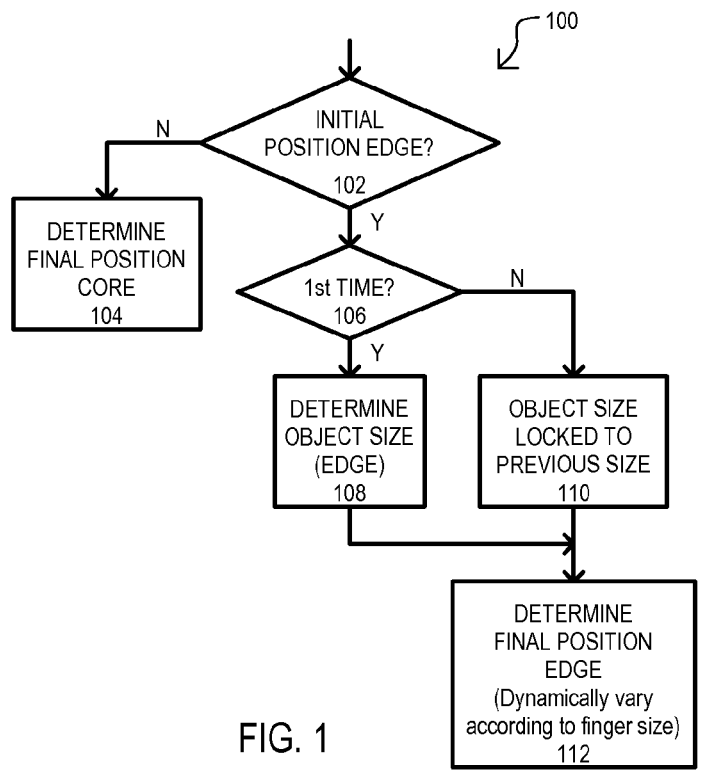
FIG. 1 is a flow diagram of a method according to an embodiment.

Various embodiments will now be described that show object position sensing methods and systems that can provide more accurate and linear responses at edge locations (including corners) of a sensing area. Very particular embodiments are directed to touch capacitance sensing methods and/or systems having a sensing area formed by a number of adjacent sensors.

According to some embodiments, an object size can be "locked" to a previously determined size when a final edge position is determined. Such an approach can eliminate wide variations in object size that can occur in conventional approaches.

According to some embodiments, determination of a final position can rely on two metrics, one of which can dynamically vary according to object size. Such an approach can provide accurate object position despite differences in object size and/or shape.

In the various embodiments below, like items are referred to by the same reference characters, but with the leading digit(s) corresponding to the figure number.

FIG. 1 is a flow diagram showing a method 100 according to one embodiment. A method 100 can correspond to a sensing area having a "core" area (e.g., an inner region) bounded by one or more edges. A sensing area can have any suitable shape.

A method 100 can include making an initial determination if an object is at an edge position (102). Such an action can include using initial sensing data to determine if an object is proximate to an edge of a sensing region. In very particular embodiments, a sensing region can include multiple sensors, each of which generates a sense value. Local maximums (or minimums) of such sensor values can be used to make an initial determination of an object position. In some embodiments, a sensing surface can include edges and corners, and such an action can determine if an object is near an edge (including a corner). In some embodiments, proximity to all edges of a surface can be determined. However, in other embodiments, such determination can be applied to less than all edges, including one edge.

If an initial position of an object is not an edge position (N from 102), a method 100 can determine a final core position (104). Such an action can include any suitable method for sensing an object position for sense surface. In particular embodiments, a sensing region can include multiple sensors, and a position can be calculated using a centroid from a local group of sensors (identified by maxima or minima).

If an initial position of an object is an edge position (Y from 102), a method 100 can determine if an object is being detected for a first time (106). Such an action can utilize any suitable object tracking method for associating an object with a previous object position or trajectory. If an object is being detected for a first time (Y from 106), a method 100 can determine a size of the object (108). Such an action can determine an object size based on edge sensors values. According to some embodiments, such an action can utilize calculations that are different from those that determine an object size within a core (not shown).

If a method 100 determines that an object proximate an edge is not being detected for a first time (N from 106), a method can lock an object size to that of a previously determined size. In particular embodiments, this can include any suitable object tracking method determining that the object is the same as that previously sensed or part of a trajectory. This is in contrast to conventional approaches that may continue to update object size with each position determination calculation.

A method 100 can then determine a final edge position (112). In the particular embodiment shown, such a determination can dynamically vary according to finger size. Such an action is also in contrast to conventional approaches, such as those noted above.

Figure 2:
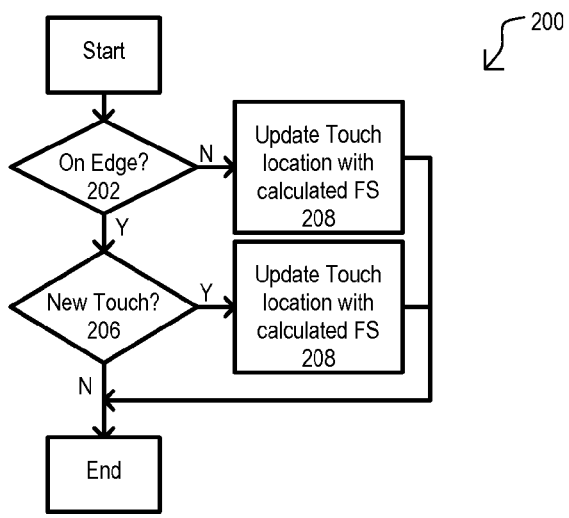
FIG. 2 is a flow diagram of a method according to another embodiment.

FIG. 2 is a flow diagram showing a method 200 according to another embodiment. A method 200 can correspond to a touch surface that calculates the location of one or more fingers. A method 200 can include making an initial determination as to whether a finger is proximate to an edge (which can include a corner, in some embodiments) (202). If an initial position is not proximate to an edge (N from 202), a method 200 can update a touch location with a calculated finger size (FS) value (208).

If an initial position is proximate to an edge (Y from 202), a method 200 can determine if a touch is a new touch (206). If a touch is a new touch (Y from 206), a method 200 can update a touch location with a calculated finger size value (208). However, in sharp contrast to conventional approaches such as those noted above, if a touch is not a new touch (N from 206), a touch location is not updated with a calculated finger size value. That is, a finger size has been locked, and a final edge position calculation can use a previous finger size value.

Figure 3:
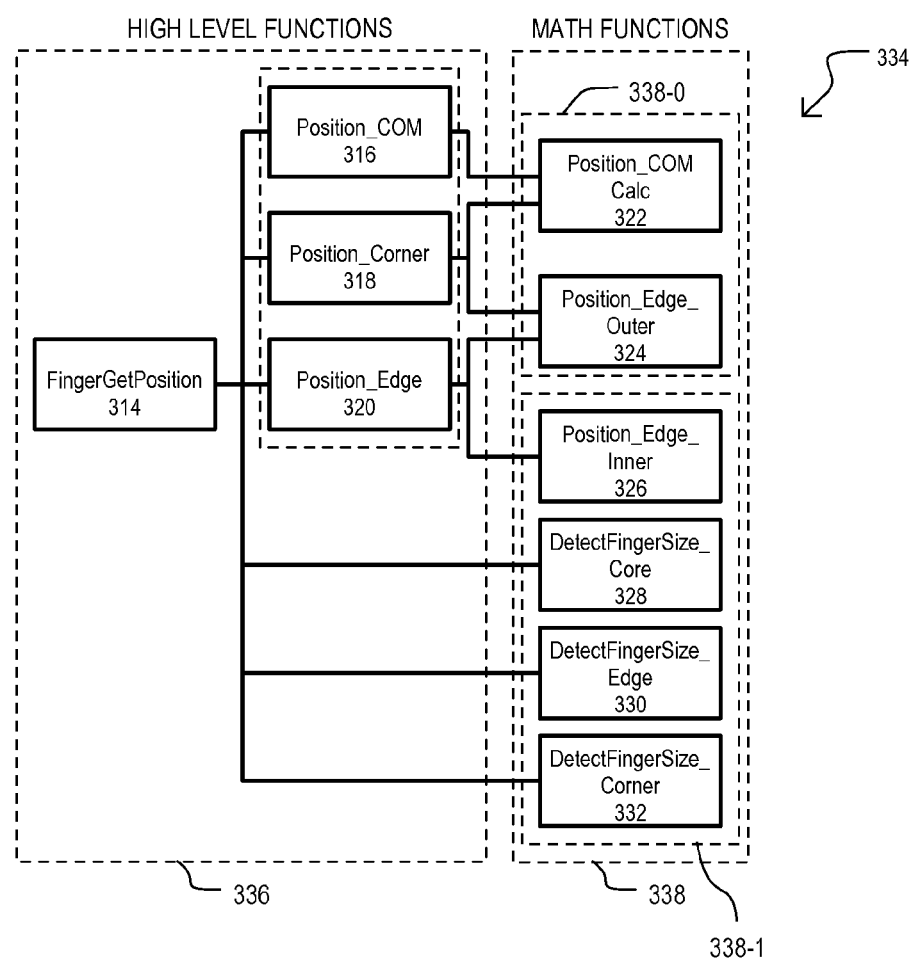
FIG. 3 is a block diagram of a system and function hierarchy according to embodiments.

FIG. 3 is a block diagram of a system 334 having a hierarchy of processing functions. Such processing functions 334 can be realized with any suitable hardware. In particular embodiments, all or a portion of such functions can be instructions executable by a processor. However, in other embodiments, all or a portion of such functions can be realized by logic circuits (including programmable logic). In the embodiment of FIG. 3, it is assumed that a touch area has a core regions bounded by edges, where such edges form corners.

The embodiment of FIG. 3 corresponds to a touch system that detects finger positions. However, it is understood that alternate embodiments can include systems that detect objects other than fingers. Accordingly, while the description of FIG. 3 uses the term "finger", in other embodiments such a finger can correspond to some other object.

In the embodiment of FIG. 3, the functions can be divided into two groups, including high level functions 336 and math functions 338. High level functions 336 can include an acquire finger position function (FingerGetPosition) 314, and position determination functions (Position_COM, Position_Corner, and Position Edge). A FingerGetPosition function 314 can acquire raw data values for a touch location. In very particular embodiments, such an action can acquire sensor values for a grid surrounding a local maximum sensor value (or minimums sensor value according to sensing technique). In some embodiments, FingerGetPosition 314 can also determine if more than one finger has been detected.

In the embodiment shown, different position determination functions can be utilized according to an initial position determination. A Position_Edge function 320 can determine a final object (e.g., finger) position for edge locations, a Position_Corner function 318 can determine a final object position for corner locations, and a Position_COM function 316 can determine a final position for other locations (including core locations).

According to some embodiments, Position_Edge and Position_Corner functions can utilize virtual sensor values to calculate a final finger position. More particularly, a final finger positions can be calculated based on a grid of sensor values, where a portion of the grid is composed of virtual sensors having positions located beyond the edge of the sensor area. In very particular embodiments, virtual sensor values can vary dynamically according to finger size.

Higher level functions 336 can utilize math functions 338 to arrive at a final object position. Math functions 338 can include position calculation functions 338-0 and finger size calculation functions 338-1. Position calculation functions 338-0 can include a final position calculation function (Position_COM_Calc) 322. In addition, such functions can include two edge positions calculation functions (Position_Edge_Outer and Position_Edge_Inner). Position_Edge_Outer can correspond to an initial touch position having a first distance from an edge, and Position_Edge_Inner can correspond to an initial touch position closer to the edge than the first distance. In very particular embodiments, functions Position_Edge_Outer and Position_Edge_Inner can populate "virtual sensor" locations to enable the higher level functions 316 to derive a final object position.

Finger size calculation functions 338-1 can include different functions according to finger position. In the embodiment shown, a first function can be utilized for touch locations in a core (DetectFingerSize_Core 328), a second function can be utilized for touch locations proximate to an edge (DetectFingerSize_Edge 330), and a third function can be utilized for touch locations proximate to an edge (DetectFingerSize_Corner 332).

Figure 4:
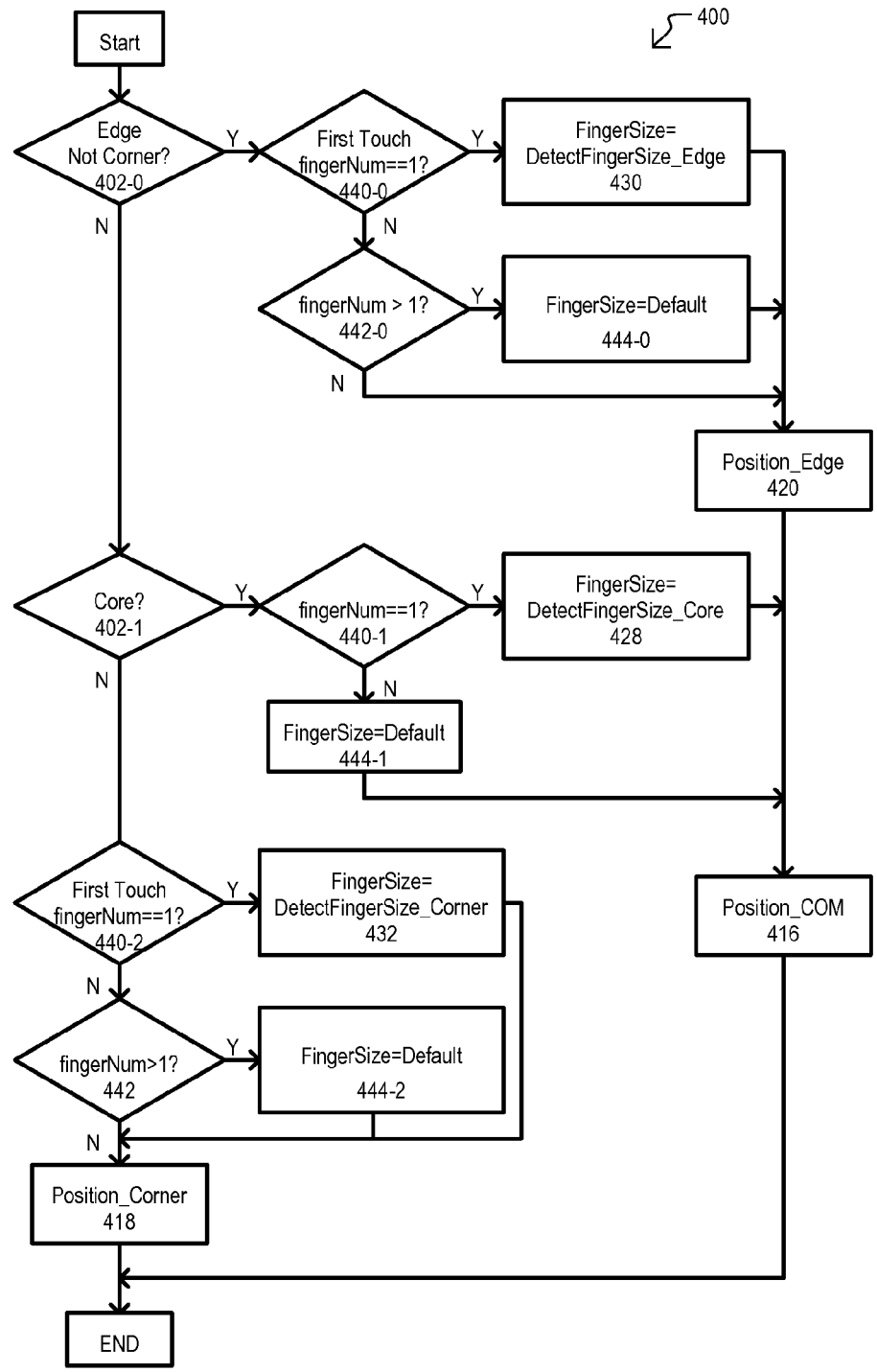
FIG. 4 is a flow diagram of a finger position determination method according to an embodiment.

Having described system processing functions, a method using such functions will now be described. FIG. 4 is a flow diagram of a finger position sensing method that can utilize functions shown in FIG. 3.

A method 400 can include an initial determination of whether a touch is at an edge location and not a corner location (402-0). If a touch is an edge (and not a corner) (Y from 402-0), a method 400 can determine if a touch is a first touch of a single finger (440). If so (Y from 440-0), a method can detect a finger size using a function DetectFingerSize_Edge (i.e., a finger size detection calculation particular to an edge location). A final edge position can then be determined with a function Position_Edge (420). As noted above, in particular embodiments, such a function can dynamically vary a position calculation based on a finger size.

If the initial edge position is not a first touch (N from 440-0), a method 400 can determine if multiple fingers are detected (442-0). If multiple fingers are detected (Y from 442-0), a finger size can be set to a default value (444-0), and a final edge position can then be determined with a function Position_Edge (420).

If the initial edge touch is not a first touch or a multiple touch (N from 442-0), a method 400 can determine a final edge position with a function Position_Edge (420). It is understood that such an action will utilize a previously calculated finger size, and not update a finger size for such a calculation. Said in another way, such an action can rely on locking a finger size prior to determining the final edge position.

If an initial position is not an edge (N from 402-0), a method 400 can determine if an initial touch is within a core region (402-1). If the initial touch is within the core region (Y from 402-1), a method 400 can determine if a touch is a single finger (440-1). If so (Y from 440-1), a method can detect a finger size using a function DetectFingerSize_Core (i.e., a finger size detection calculation particular to a core). A final core position can then be determined with a function Position_COM (416). If an initial core determination corresponds to multiple fingers (N from 440-1), a method can set a finger size to a default value (444-1), and then determine a final core position with a function Position_COM (416).

If an initial position is a corner position (N from 402-1), a method 400 can determine if a touch is a single finger (440-2). If so (Y from 440-2), a method can detect a finger size using a function DetectFingerSize_Corner (i.e., a finger size detection calculation particular to a corner). A final core position can then be determined with a function Position_Corner (418). If an edge determination corresponds to multiple fingers (Y from 442), a method can set a finger size to a default value (444-2), and then determine a final core position with a function Position_Corner (418).

If the initial corner touch is not a first touch or a multiple touch (N from 442), a method 400 can determine a final corner position with a function Position_Corner (418). As in the case of the edge position determination noted above, it is understood that such an action will utilize a previously calculated finger size, and not update a finger size for such a calculation (i.e., finger size is locked going into the final corner position determination).

According to embodiments, which can include those noted above, final position determinations for edges and/or corner locations can utilize virtual sensor values. According to some embodiments, virtual sensor values can vary dynamically according to finger size. Very particular embodiments of such virtual sensor value calculations will now be described.

Figures 0, 5A:
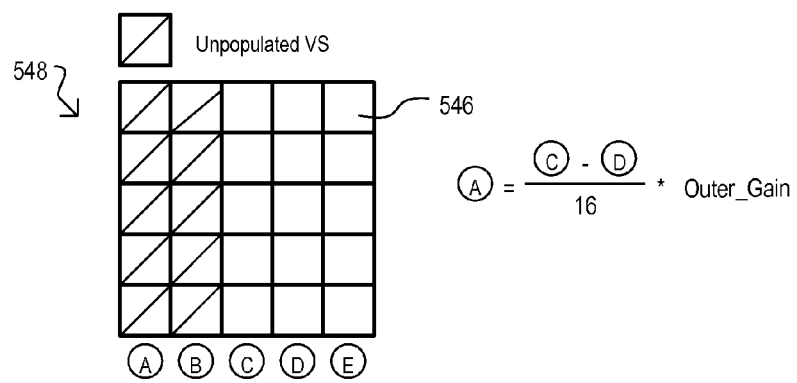
Figures 1, 5A:
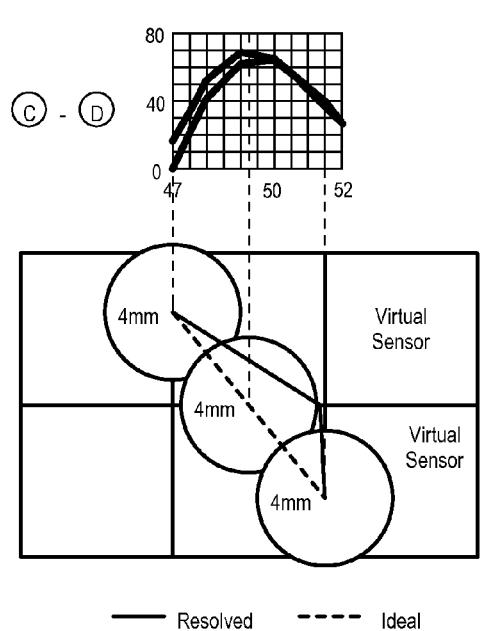
Figures 2, 5A:
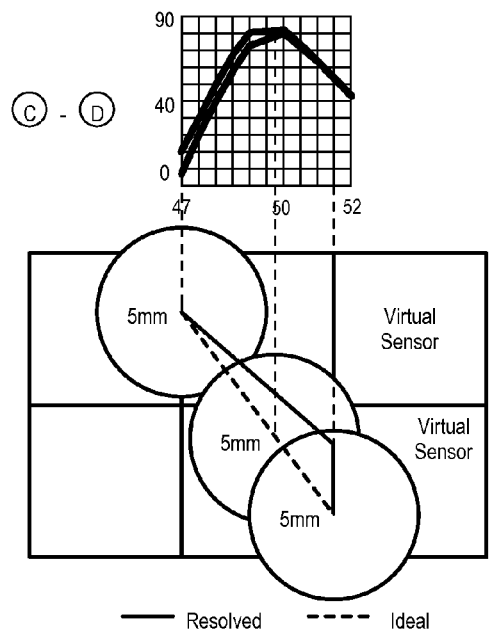
Figures 3, 5A:
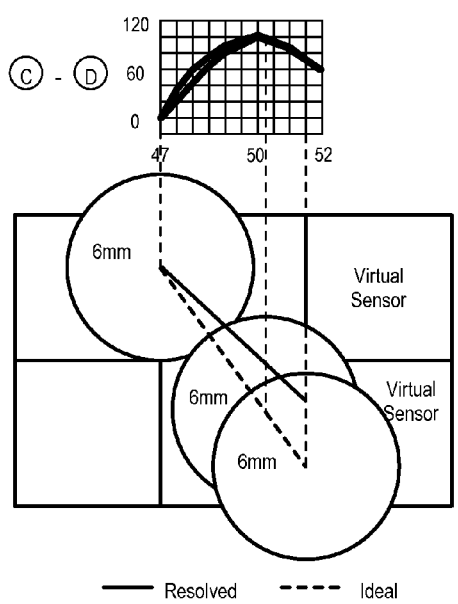
Figures 4, 5A:
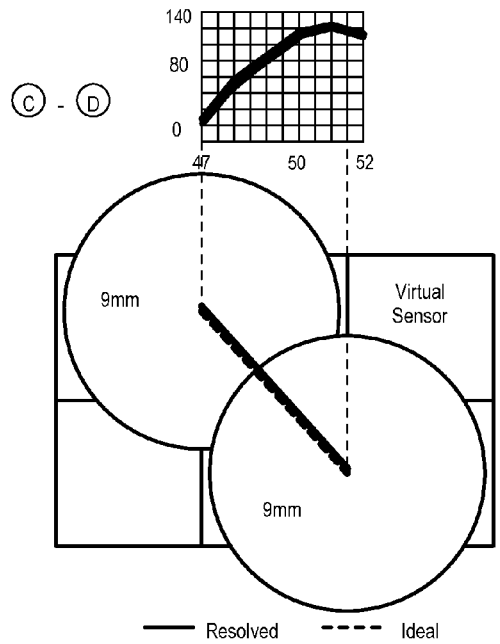
Figures 0, 5B:
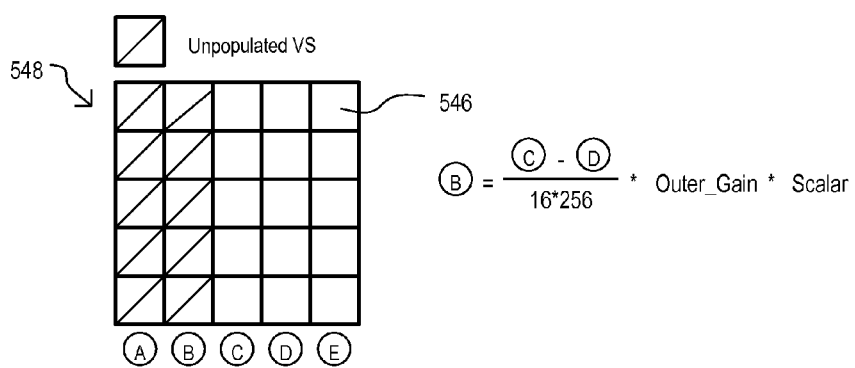
Figures 1, 5B:
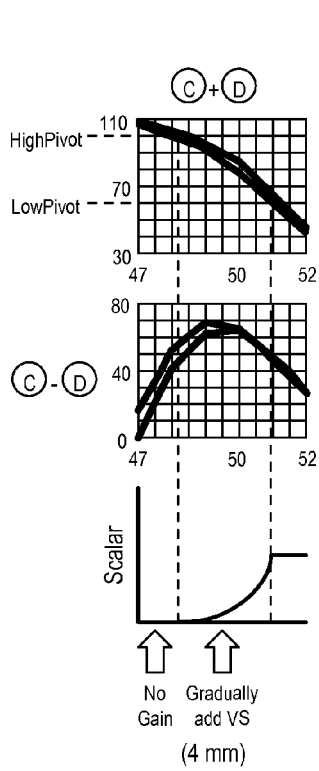
Figures 2, 5B:
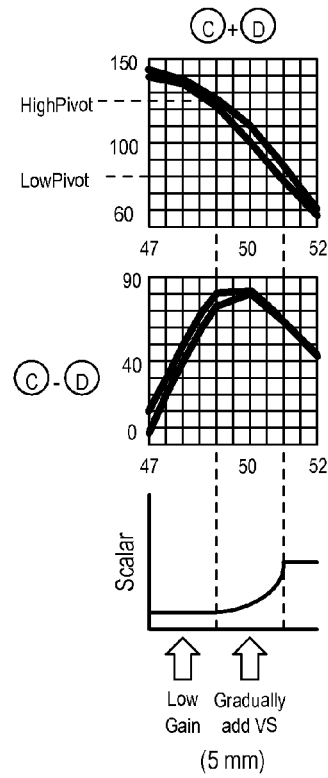
Figures 3, 5B:
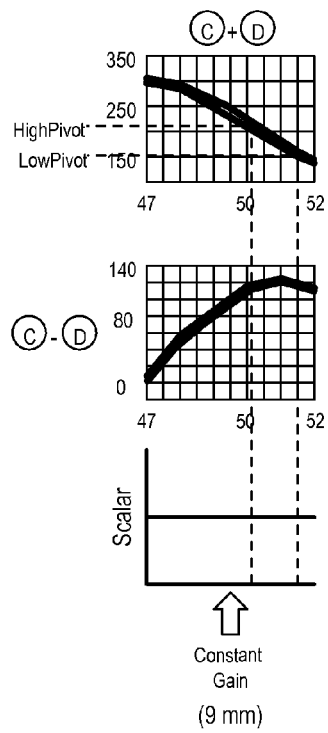
Figure 5C:
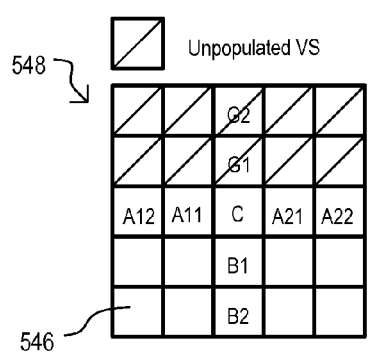
FIG. 5C is a diagram showing the generation of virtual sensor values according to an alternate method.

FIGS. 5A-0 to 5C show various contributors for calculating virtual sensor values according to various embodiments. The embodiments shown correspond to a 5×5 grid of sensors, in which one sensor value is a local maximum. However, it is understood that alternate embodiments can include a smaller grid, or rely on other sensor indications to identify a touch (i.e., local minimum). Further it is understood that the 5×5 grid is a logical representation of sensor values for sensors proximate to one another. Actual sensors can have various shapes (e.g., diamonds, circles, lines, etc.).

FIGS. 5A-0 to 5A-4 show a first contributor to a virtual sensor value.

FIG. 5A-0 shows a 5×5 grid 548 of sensor values (one shown as 546). In the particular orientation shown, the grid can include columns C, D and E which can correspond to actual sensors, while columns A and B can correspond to virtual sensors (i.e., the sensors end to the left of column C).

It is understood, and will be shown in more detail below, that while FIG. 5A-0 shows a particular orientation (i.e., virtual sensors on a left edge), grids can have various orientations (e.g., virtual sensors can be on top rows, right columns, or on the bottom rows), and then be translated to a common alignment for position calculation. The orientation can then be translated back to arrive at the proper final position.

Referring to FIG. 5A-0, a first contributor can be a calculation for virtual sensors in column "B" and can be given by $$B=(C-D)*\text{Outer\_gain}/\text{Gain\_Scaling, where}$$

C is an actual sensor value closest to the virtual sensor (A); D is the next closest actual sensor value; Outer_gain can be a gain value; and a Gain_Scaling can be a scaling value (which is 16 in FIG. 5A-0).

FIGS. 5A-1 to 5A-4 show various results for the C-D calculation noted above, as compared to an ideal response, for four different finger sizes: 4 mm, 5 mm, 6 mm and 9 mm, respectively. As shown, the smaller the finger size, the greater the variation from an ideal response (e.g., the presence of scalloping).

FIGS. 5B-0 to 5B-3 show a second contributor to a virtual sensor value. Such a second contributor can vary dynamically according to finger size. Such a second contributor can introduce more variation into a final position value, and so can be adjusted according to finger size.

FIG. 5B-0 shows a 5×5 grid 548 of sensor values as in the case of FIG. 5A-0. Adding the second contributor can give the following calculation for virtual sensors in column "B":

$$B=(C-D)*\text{Outer\_gain}*\text{Scalar}/\\(\text{Gain\_Scaling}*\text{Scalar\_Scaling), where}$$

"Scalar" can be a value that can dynamically vary according to finger size (e.g., C-D); and Scalar_Scaling can be a second scaling value (which is 256 in FIG. 5B-0).

FIGS. 5B-1 to 5B-3 show how a scaling value can dynamically vary for different finger sizes according to one very particular embodiment. Each of FIGS. 5B-1 to 5B-3 shows graphs corresponding to values C+D and C-D, and a corresponding dynamic scalar value.

FIG. 5B-1 shows a scalar response for a smaller object (in this case, a 4 mm finger size). In a first portion of a response (where C+D is large and C-D is small), a scalar value can be zero, for no gain. No gain is needed, as the signal is increasing rapidly on the edge sensor C and decreasing rapidly on the next sensor D to provide accurate tracking of the object (finger). This first response can continue to a HighPivot position. Following the HighPivot position, as C-D reaches its peak, virtual sensor values are needed to simulate the object beyond the edge, so the scalar is gradually increased. This gradual increase can occur until a LowPivot position. Following the LowPivot position a gain value can remain constant.

FIG. 5B-2 shows a scalar response for a slightly larger object (in this case, a 5 mm finger size). In a first portion of a response, a scalar value can be a constant value, but at the low end of the scalar range (for a constant, low gain). This first response can continue to a HighPivot position. Following the HighPivot position, gain value can gradually increase, increasing a value of a virtual sensor. As in the case of the smaller sized object (i.e., 4 mm), this gradual increase can occur until a LowPivot position. Following the LowPivot position a gain value can be a constant, high value.

FIG. 5B-3 shows a scalar response for a large object (in this case, a 9 mm finger size). As shown in FIG. 5A-4, a large object can resolve position accurately with just the first contributor (i.e., without the variable scalar). Consequently, for the large object case, a scalar value can be maintained at a constant, high value.

FIG. 5C shows a 5×5 grid 548, like that of FIG. 5A-0. However, unlike FIG. 5A-0, virtual sensor locations are shown on the top two rows. FIG. 5C shows one possible alternate embodiment calculation for a first contributor. As shown, a virtual sensor value in one direction (vertical direction) can be generated to match sensor values in a perpendicular direction. This is shown as $$A11+A12=B1+G1, \text{ where}$$

in some embodiments, a scalar that dynamically varies according to finger size can be used to modify the value G1, as described above.

As noted above, embodiments can include translating sets of sensors to a common orientation to enable one calculation to populate virtual sensor values. Such translation, according to one very particular embodiment, is shown in FIG. 6.

Figure 6:
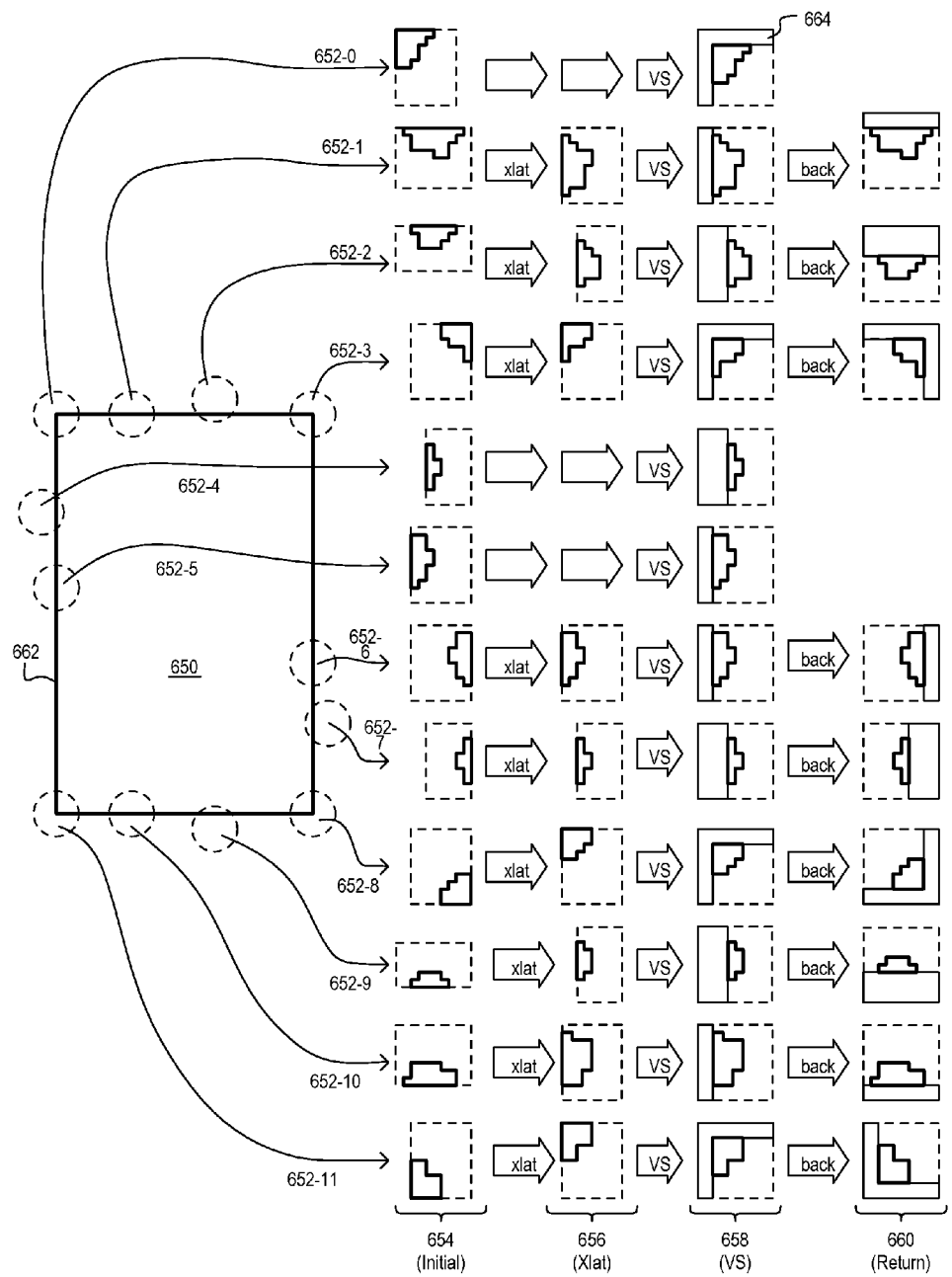
FIG. 6 is a diagram showing the translation of sensor space to commonly align edge locations, according to an embodiment.

FIG. 6 shows a rectangular sensing area 650 bounded by an edge 662. FIG. 6 also shows operations 652-0 to 652-11 corresponding to various edge locations. Such operations (652-0 to 652-11) can include acquiring initial sensor values (654), a translation step (656) to commonly align an edge, if needed, the generation of virtual sensor values (658), and translation back to an original orientation (660).

Particular operations will now be described.

Operation 652-0 shows a corner position sensing operation. Initial sensor values can be acquired. Because, the sensor grid already has an edge aligned with a left side, no translation can take place. For the corner case, virtual sensor values (shown in this case as 664) can be generated for a left side and a top row. Because the sensor set was not translated to a different orientation, it does not need to be translated back.

Operation 652-1 shows an inner top edge sensing operation. A translation operation can align the top edge with a left edge. Virtual sensors values can be generated, then the grid can be translated back.

Operation 652-2 shows an outer top edge sensing operation. A translation operation can align the top edge with a left edge. Virtual sensors values can be generated. Because the sense region is an outer edge, a number of virtual sensors can be greater than the inner edge case (e.g., 652-1). The grid can then be translated back.

The remaining operations are understood from the description of operations 652-0 to 652-2. In very particular embodiments, translation operations can include various mirroring operations along horizontal, vertical and/or diagonal axes. More particular examples of such mirror operations are described in more detail below.

Figure 7A:
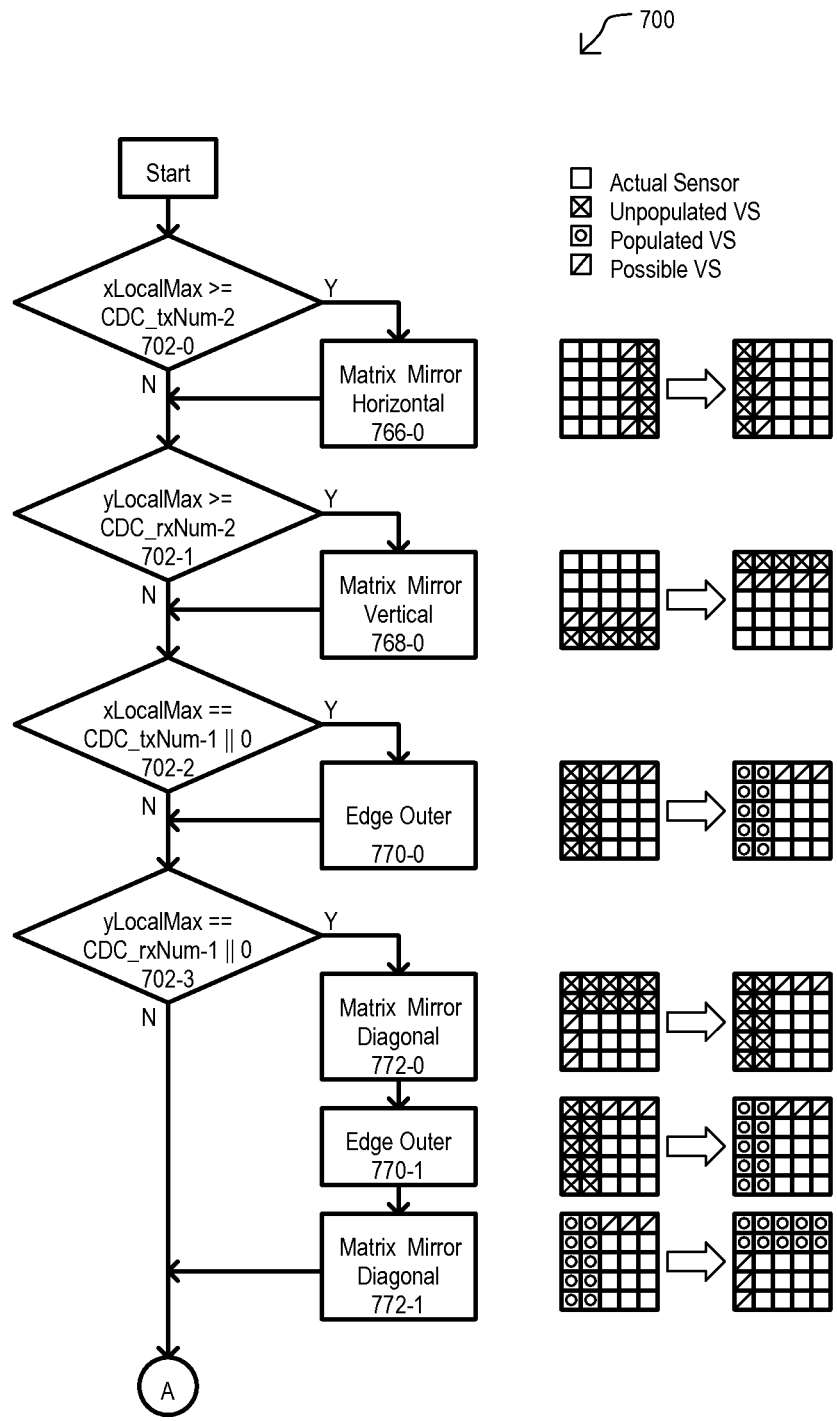
FIGS. 7A and 7B show a flow diagram of a function for generating virtual sensor values for an edge location, according to an embodiment.
Figure 7B:
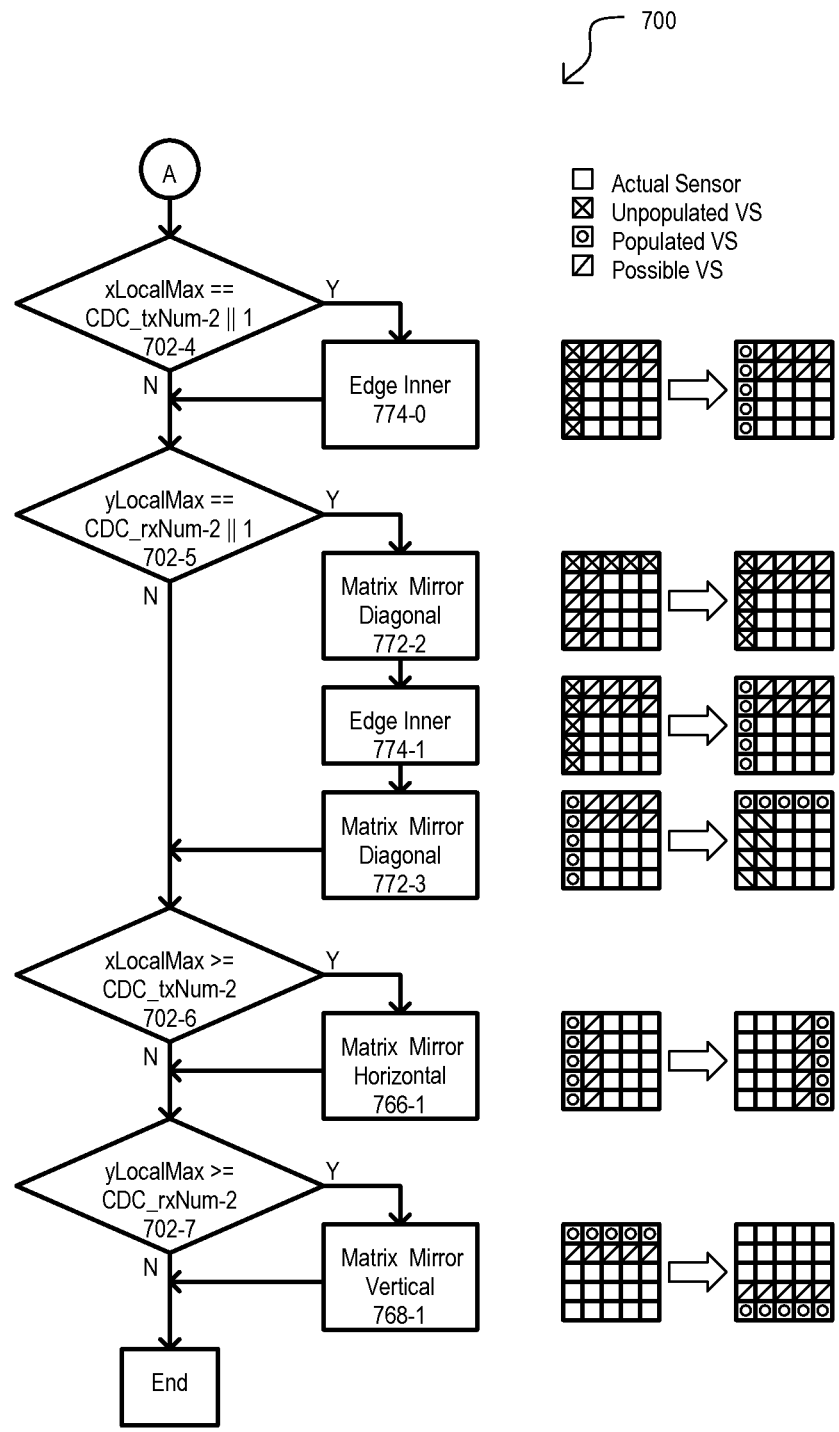

FIGS. 7A and 7B are flow diagrams showing a function 700 for setting up a grid for a position detection operation at an edge location. In function 700, a grid can be aligned along a left edge to enable final position sensing with a position sensing function. In one very particular embodiment, a function 700 can be a Position_Edge function like that shown as 320 in FIGS. 3 and 420 in FIG. 4.

In the function of FIGS. 7A/B it is assumed that a function receives local maximum values having an X-axis (xLocalMax) and Y-axis (yLocalMax) position. Further, the corresponding sense area can have a number of transmit electrodes given as "CDC_txNum", and a corresponding set of receive electrodes given as "CDC_rxNum".

Referring to FIG. 7A, a function 700 can determine if a local maximum is proximate a first edge (e.g., right side edge) of a sense area, by determining if an X-axis maximum is detected by a last number of transmit (tx) electrodes (in this case, either of the last two electrodes) (702-0). If this is the case (Y from 702-0), a function 700 can horizontally mirror the grid values (766-0). Thus, potential virtual sensors can be aligned along a left edge.

If the local maximum is not proximate the left edge (N from 702-0), the function can determine if a local maximum is proximate another edge (e.g., bottom edge) of a sense area, by determining if a Y-axis maximum is detected by a last number of receive (rx) electrodes (in this case, either of the last two electrodes) (702-1). If this is the case (Y from 702-1), a function 700 can vertically mirror the grid values (768-0). It is understood that later actions can align the vertical sensors along the left edge.

A function can then determine if the initial position represents an outer edge or inner edge case. An outer edge case can correspond to an initial position occurring at a far edge of a surface. An inner edge case can correspond to an initial position proximate to the edge, but more inset from the edge than the outer edge case. Consequently, in the outer edge case, a greater number of virtual sensors can be populated (assigned values) than the inner edge case.

In the particular embodiment shown, a first outer edge case can occur when a local X-axis maximum occurs at a last or first tx electrode (CDC_txNum-1 or 0) (702-2). If so, a function can execute an Edge Outer operation (770-0) that populates virtual sensors with values (in this case, two columns). It is understood that such virtual sensor values can be generated with a dynamic gain that varies according to calculated finger size, as described herein, or equivalents.

A second outer edge case can occur when a local Y-axis maximum occurs at a first or last rx electrode (CDC_rxNum-1 or 0) (702-3). If so, a function can diagonally mirror grid values (772-0), to align virtual sensors along a left edge. An Edge Outer operation (770-1) can then populate virtual sensors (again, in this case two columns). A function may then diagonally mirror the grid values again (772-1), to return the grid to its prior orientation.

Referring now to FIG. 7B, in the particular embodiment shown, a first inner edge case can occur when a local X-axis maximum occurs at the second to last or second tx electrode (CDC_txNum-2 or 1) (702-4). If so, a function can execute an Edge Inner operation (774-0) that populates a smaller number of virtual sensors with values than the outer edge case (in this case, one column). Again, such virtual sensor values can be generated with a dynamic gain that varies according to calculated finger size.

A second outer edge case can occur when a local Y-axis maximum occurs at a second or second to last rx electrode (CDC_rxNum-2 or 1) (702-5). If so, a function can diagonally mirror grid values (772-2), to align virtual sensors along a left edge. An Inner Edge operation (774-1) can then populate virtual sensors (again, in this case one column). Such values can be generated with a dynamic gain value, as described herein, or equivalents. A function may then diagonally mirror the grid values again (772-3), to return the grid to its prior orientation.

A function 700 can then execute additional mirroring operations, if necessary, to return the grid to its original orientation. In the embodiment shown, if the initial touch occurred on a right edge (702-6) it is horizontally mirrored (766-1) back from a left edge alignment. Similarly, if the initial touch occurred on a bottom edge (702-7) it is vertically mirrored back from a top edge alignment (768-1).

Figure 8:
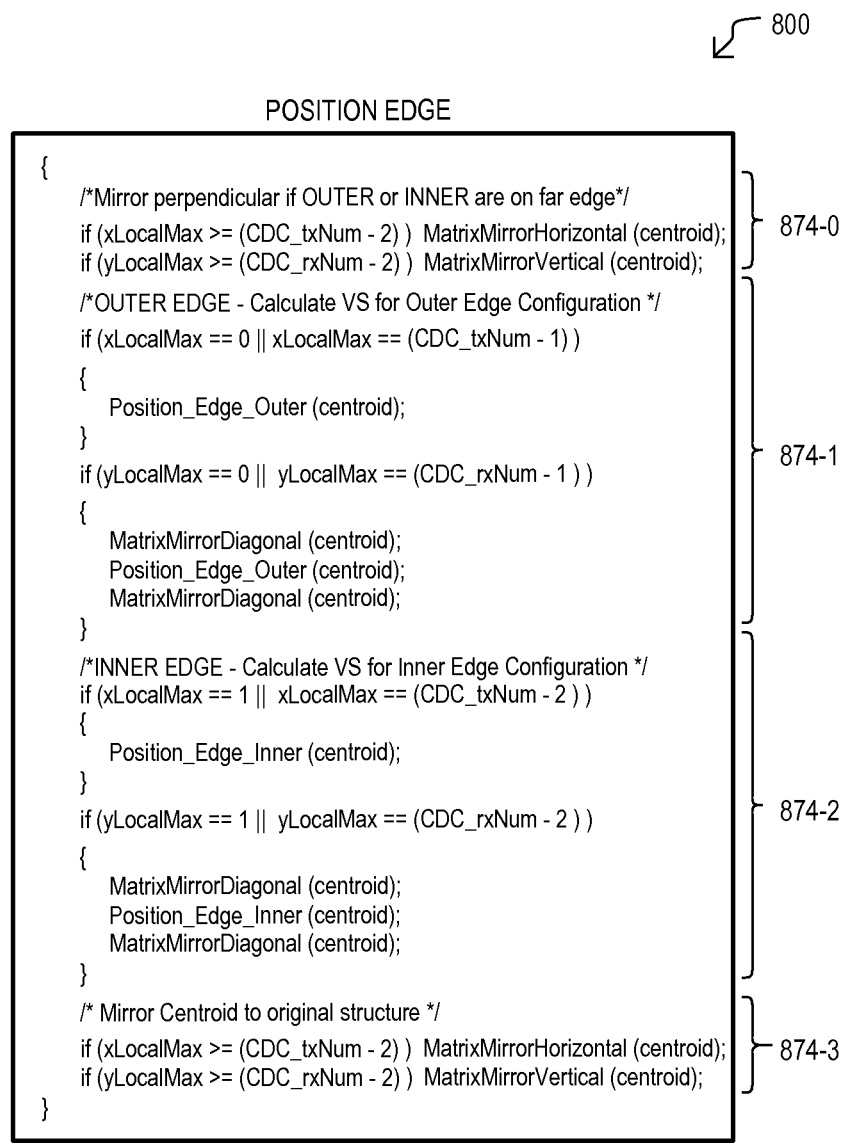
FIG. 8 is a code representation of a function for generating virtual sensor values for an object at an edge location, according to an embodiment.

FIG. 8 is a pseudocode representation of a function 800 like that shown in FIGS. 7A/B. FIG. 8 includes section 874-0, which can make initial mirror operations if an initial touch is at a far edge (e.g., far left edge or bottom edge). Such a section can correspond to 702-0, 766-0, 702-1 and 768-0 shown in FIG. 7A.

Section 874-1 can calculate virtual sensors for an "outer edge" case, which can include a greater number of virtual sensor values than an "inner edge" case. Such a section can correspond to 702-2, 770-0, 702-3, 772-0, 770-1 and 772-1 of FIG. 7A.

Section 874-2 can calculate virtual sensors for an "inner edge" case, which can include a smaller number of virtual sensor values than an "outer edge" case. Such a section can correspond to 702-4, 774-0, 702-5, 772-2, 774-1 and 772-3 of FIG. 7B.

Section 874-3 can return a grid (centroid) back to its previous orientation, if necessary. Such a section can correspond to 702-6, 766-1, 702-7 and 768-1 of FIG. 7B.

In very particular embodiments, a function 800 can be instructions executable by a processor.

Figure 9A:
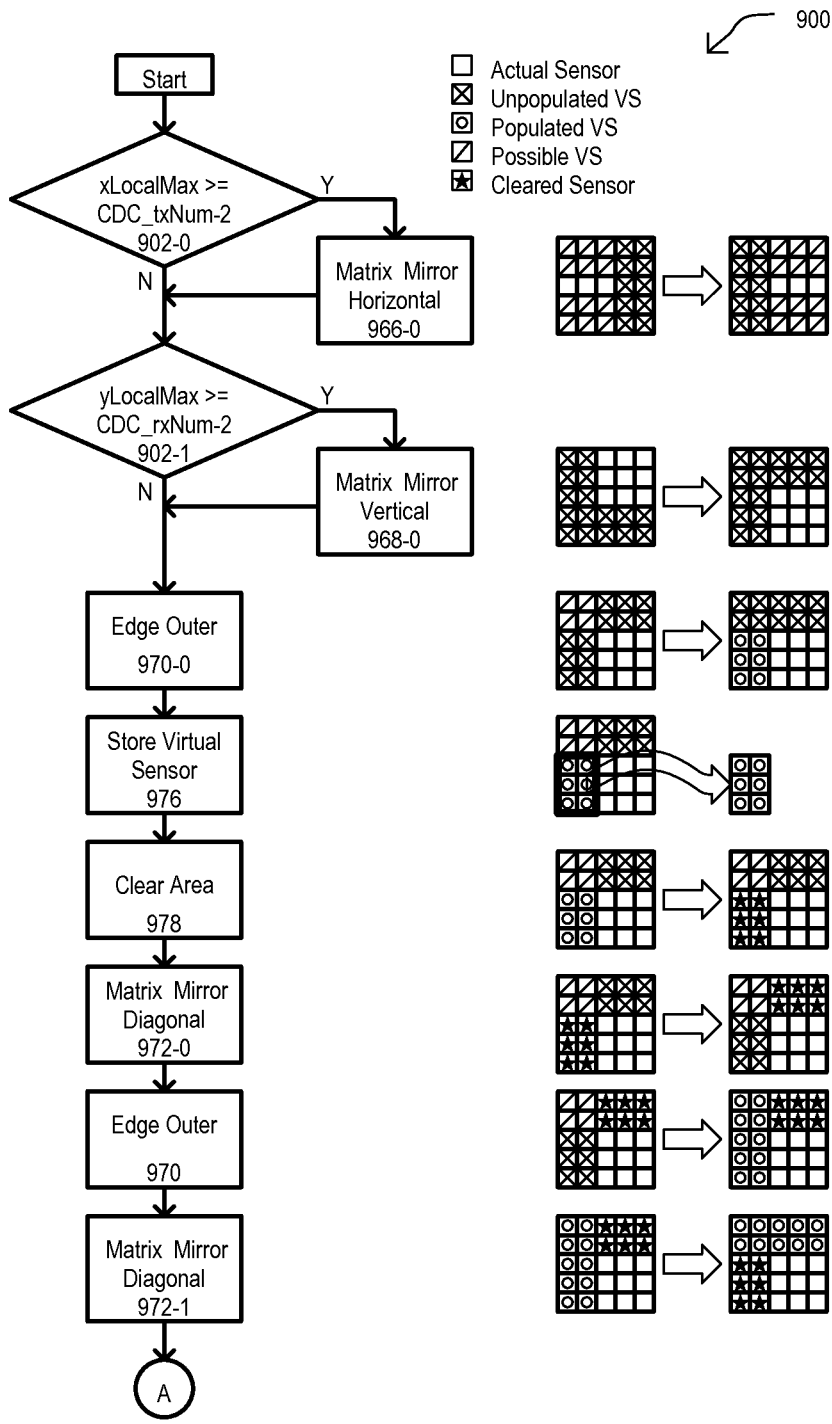
FIGS. 9A and 9B show a flow diagram of a function for generating a final position of an object at a corner location, according to an embodiment.
Figure 9B:
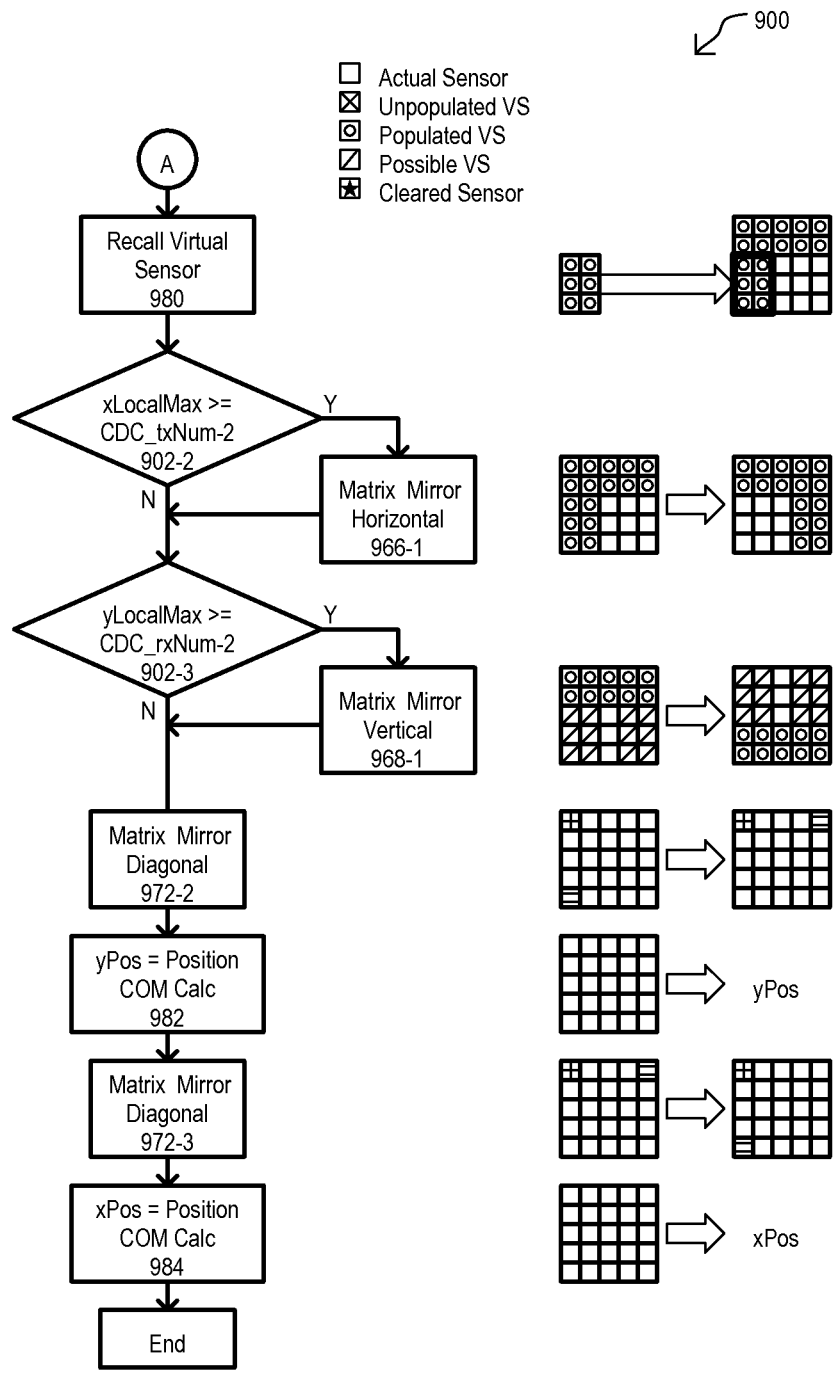

FIGS. 9A and 9B are flow diagrams showing a function 900 for setting up a grid for a position detection operation at a corner location, and calculating a final position from such a grid. In function 900, a grid can be aligned along a left edge prior to a final position sensing. In one very particular embodiment, a function 900 can be a Position_Corner function like that shown as 318 in FIGS. 3 and 418 in FIG. 4.

In the function of FIGS. 9A/B it is assumed that a function receives local maximum values having an X-axis (xLocalMax) and Y-axis (yLocalMax) position. Further, the corresponding sense area can have a number of transmit electrodes given as "CDC_txNum", and a corresponding set of receive electrodes given as "CDC_rxNum". Further, it is understood that in the function of FIGS. 9A/B, virtual sensor values can be calculated with a dynamic gain value, as described herein, or equivalents.

Referring to FIG. 9A, a function 900 can mirror a grid if a local maximum occurs on particular sides (e.g., right side or bottom). Operations 902-0, 966-0, 902-1 and 968-0 can occur in the same fashion as 702-0, 766-0, 702-1 and 768-0 of FIG. 7A.

Once a grid has been translated as needed, a function 900 can perform an Edge Outer operation (970-0) that populates virtual sensors with values (in this case, two columns). A function can then store a portion of the virtual sensors (976). Such an action can retain virtual sensor values for one edge of a corner. A function 900 can then clear those virtual sensors from which values were saved (978).

A function 900 can then diagonally mirror the grid 972-0, to align the other edge of the corner along the left side. A second Edge Outer operation (970-1) can then populate virtual sensors with values (in this case, two columns) for this second edge of the corner. A function can then diagonally mirror the grid (972-1) once again, to return the cleared virtual sensors to the left edge.

Referring now to FIG. 9B, a function 900 can recall the previously saved virtual sensor values into the cleared locations of the left edge (980). Following such an action, virtual sensor values can now be populated all around the corner values.

A function 900 can then execute additional mirroring operations, if necessary, to return the grid to its original orientation. In the embodiment shown, if the initial touch occurred on a right edge (902-2) it is horizontally mirrored (966-1) back from a left edge alignment. Similarly, if the initial touch occurred on a bottom edge (902-3) it is vertically mirrored back from a top edge alignment (968-1).

Unlike the Position Edge functions shown in FIG. 7A to 8, the function of FIGS. 9A/B can calculate a final position value. Accordingly, once virtual sensors on both sides of a corner have been populated, a function 900 can mirror a grid diagonally (972-2) and then calculate a final Y-axis position for the object (982). Such a calculation can include any suitable calculation for arriving at a position given actual and virtual sensor values. Very particular examples of final position calculation functions will be described in more detail below.

In the embodiment shown, once a Y-axis position has been determined, the grid can be diagonally mirrored (972-3) back to its previous position. A final X-axis position can then be calculated (984).

FIG. 10 is a pseudocode representation of a function 1000 like that shown in FIGS. 9A/B. FIG. 10 includes section 1074-0, which can make initial mirror operations if an initial touch is at a far edge (e.g., far left edge or bottom edge) to align a first corner edge on a left side. Such a section can correspond to 902-0, 966-0, 902-1 and 968-0 shown in FIG. 9A.

Section 1074-1 can calculate virtual sensors for the first corner edge "Position_Edge_Outer", store these values "StoreGrid( )", then clear the virtual sensor locations. The function can then align the second corner edge on the left side, calculate virtual sensor values for the second corner edge, and then orient the grid so the second edge values are aligned on a top edge. Such a section can correspond to 970-0, 976, 978, 972-0, 970 and 972-1 of FIG. 9A.

Section 1074-2 can recall the first edge values back into grid, and then mirror the values as necessary to return them to an original orientation. Such a section can correspond to 980, 902-2, 966-1, 902-3, 968-1 of FIG. 9B.

Section 1074-3 can include orienting the grid to calculate a Y-axis position "yPos=Position_COM_Calc". The grid can be oriented back to calculate an X-axis position "xPos=Position_COM_Calc". Such a section can correspond to 972-2, 982, 972-3 and 984 of FIG. 9B.

Figure 11A:
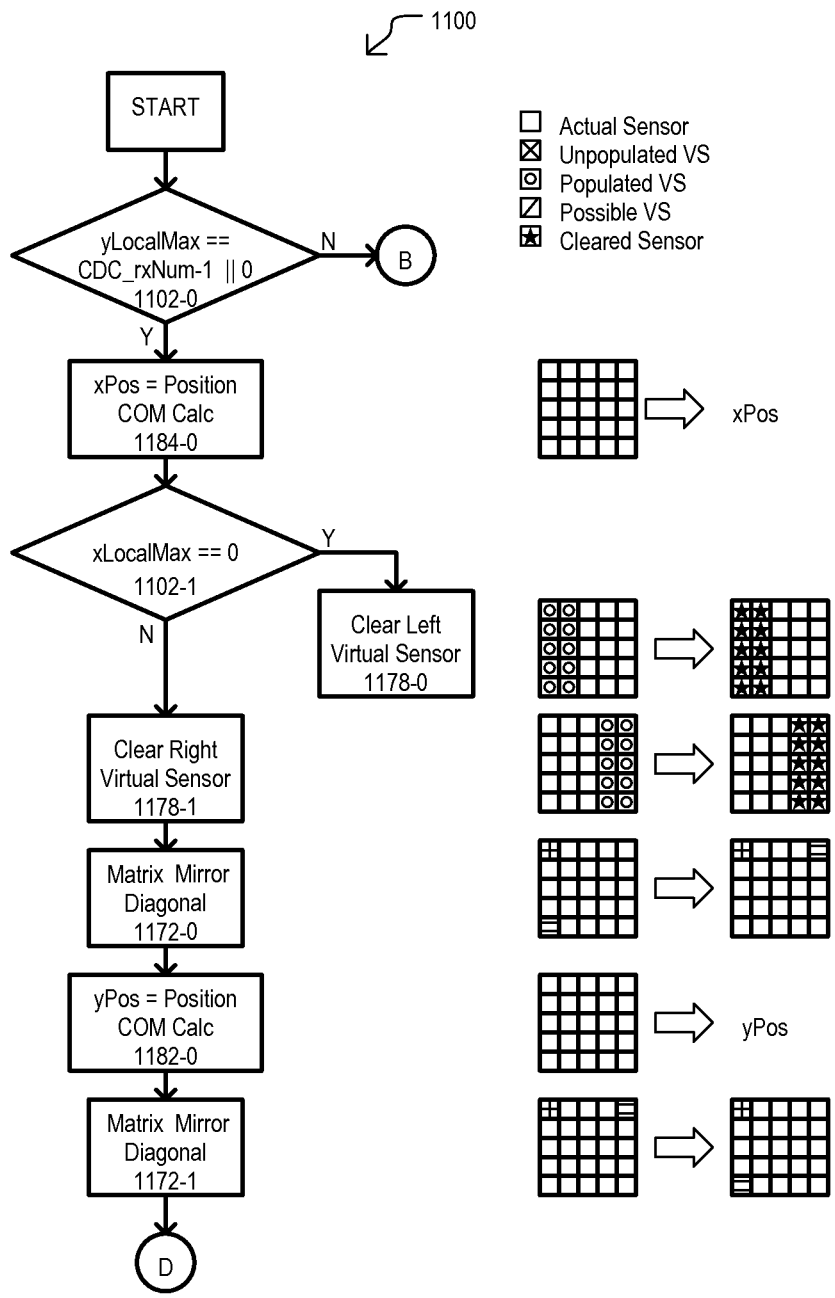
FIGS. 11A to 11C show a flow diagram of a function for calculating a final position of an object at edge and core locations, according to an embodiment.
Figure 11B:
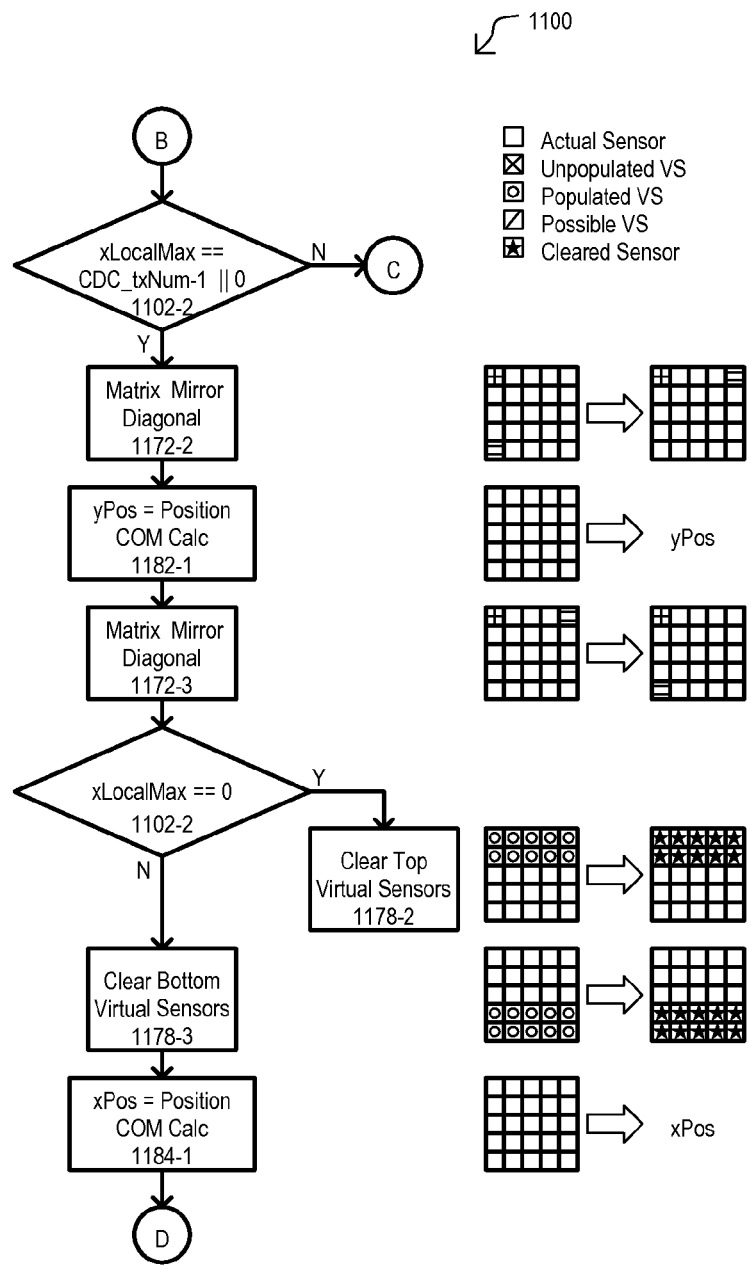
Figure 11C:
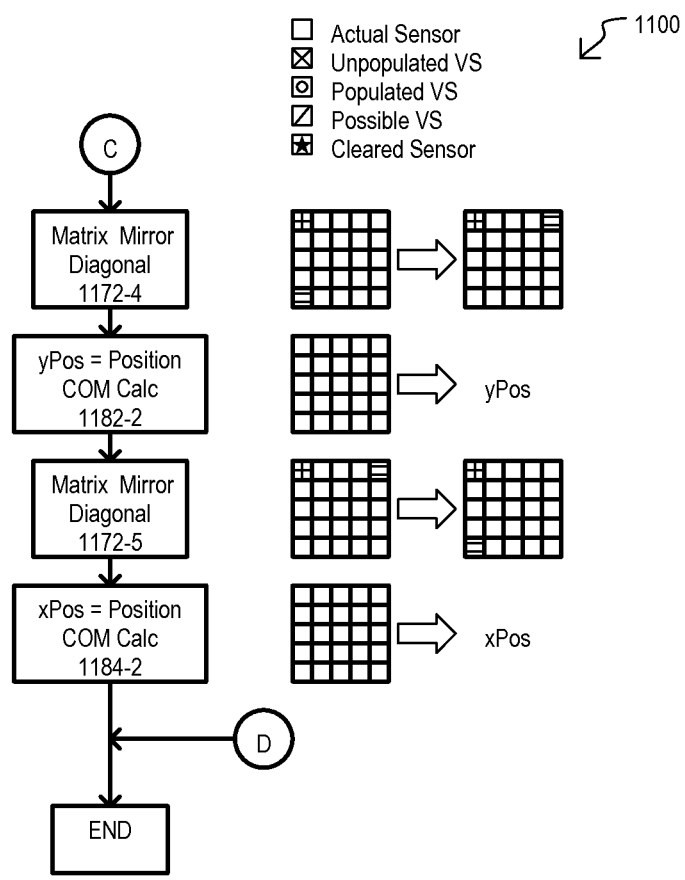

FIGS. 11A to 11C are flow diagrams showing a function 1100 for calculating final X-axis and Y-axis positions for an object. In one very particular embodiment, a function 1100 can be a Position_COM function like that shown as 316 in FIGS. 3 and 416 in FIG. 4.

In the function of FIGS. 11A-11C it is assumed that a function receives local maximum values and a number of transmit and receive electrodes as noted for the functions of FIGS. 7A to 10. In the function of FIGS. 11A-11C, virtual sensor values can be calculated with a dynamic gain value, as described herein, or equivalents.

Referring to FIG. 11A, a function 1100 can determine if a local Y-axis maximum occurs on the top (first) or bottom (last) sensor row (1102-0). If this is not the case (N from 1102-0), a function can proceed to the actions shown in FIG. 11B. If this is the case (Y from 1102-0), a function 1100 can calculate a final X-axis position (1184-0).

A function 1100 can then determine if a local X-axis maximum occurs on first column (i.e., left edge). If this is the case (Y from 1102-1), a function can clear left virtual sensor values (1178-0).

If a local maximum is at a top edge or bottom edge, but not a left edge (N from 1102-1), a function 1100 can clear right virtual sensor values (1178-1). A grid can then be translated diagonally (1172-0) and a final Y-axis position (1182-0) can be calculated. The grid can then be translated back to its previous orientation (1172-1). A function 1100 can then end (see FIG. 11C).

Referring now to FIG. 11B, if a local Y-axis maximum is not on a top or bottom edge, a function 1100 can determine if a local X-axis maximum is on a left or right edge (1102-0). If this is not the case (N from 1102-2), a function can proceed to the actions of FIG. 11C. If this is the case (Y from 1102-2), a grid can then be translated diagonally (1172-2) and a final Y-axis position (1182-1) can be calculated. The grid can then be translated back to its previous orientation (1172-3).

A function 1100 can then determine if a local X-axis maximum occurs on first column (i.e., left edge). If this is the case (Y from 1102-2), a function can clear top virtual sensor values (1178-2). If this is not the case (N from 1102-2), bottom virtual sensor values can be cleared (1178-3). A final X-axis position can then be calculated (1184-1). A function 1100 can then end (see FIG. 11C).

Referring now to FIG. 11C, if a local Y-axis and X-axis maximums are not on top or bottom edges, a function 1100 can translate a grid diagonally (1172-4) and a final Y-axis position (1182-2) can be calculated. The grid can then be translated back to its previous orientation (1172-5), and a final X-axis position (1184-2) can be calculated.

FIG. 12 is a pseudocode representation of a function 1200 like that shown in FIGS. 11A to 11C. FIG. 12 includes sections 1274-0, 1274-1 and 1274-3, which can correspond to FIGS. 11A, 11B and 11C, respectively.

As noted above, according to embodiments, a finger size value can be locked (if previously determined) or calculated to determine a final edge (including corner) position. Further, a virtual sensor value used for such a final determination can dynamically vary for different finger sizes. While embodiments can include any suitable finger size determination calculation, very particular finger size calculation methods will now be described.

FIGS. 13A to 13B-1 show finger size calculation functions for finger occurrences (e.g., touches) within a core region of a sensing area (i.e., not an edge or corner region). FIG. 13A shows equations for a function 1300 that can calculate a finger size. Equation 1 shows a linear approximation for finger size. Values f1 and f2 correspond to maximum and minimum finger sizes. Values z1 and z2 are local sensor summation values (e.g., sums of all sensors of a grid) corresponding to maximum and minimum finger sizes. Such values can vary according to system components, and so can be design data for a system. Value zSum can be an actual summation of sensor values for a grid of interest (e.g., grid with local maximum).

FIG. 13B-0 is a graphical representation of a function 1300' that utilizes a zSum value as an input (In) to a linear approximation of finger size to derive a finger size value (Out).

FIG. 13B-1 is a pseudocode version of a function 1300" utilizing the equations of FIG. 13A. It is noted that the summation value (zSum) is taken for a 3×3 grid of sensors, but other embodiments can calculate a summation using a larger number of sensors (e.g., 5×5). Further, in the function of FIG. 13B-1, if a summation value exceeds a maximum finger size (f1), the finger size value can be set to f1. Similarly, if a summation value is less than a minimum finger size (f2), the finger size value can be set to f2.

In very particular embodiments, any of the functions of FIGS. 13A to 13B-1 can be particular implementations of those shown as 328 in FIG. 3 or 428 in FIG. 4.

FIGS. 14A to 14B-1 show finger size calculation functions for finger occurrences (e.g., touches) at an edge position of a sensing area. Such functions can be utilized when an object is first detected (e.g., first touch occurs) at an edge location, so that a finger size has not yet been locked for the edge location.

FIG. 14A shows equations for a function 1400 like that of FIG. 13A, however, magnitude values for the linear approximation have been halved (accounting for the reduced actual sensor count at an edge location). Otherwise, the equations of FIG. 14A can follow those of FIG. 13A.

FIG. 14B-0 is a graphical representation of a function 1400' in which a zSum value can be an input (In) to a linear approximation of finger size to derive a finger size value (Out) at an edge position. Again, the response follows that of FIG. 13B-0, but utilizes half the magnitude values of a core position case.

FIG. 14B-1 is a pseudocode version of a function 1400" utilizing the equations of FIG. 14A. As in the case of FIG. 13B-1, other embodiments can calculate a summation using a larger number of sensors, and a function can have a maximum finger size (f1) and minimum finger size (f2).

In very particular embodiments, any of the functions of FIGS. 14A to 14B-1 can be particular implementations of those shown as 330 in FIG. 3 or 430 in FIG. 4.

Figures 15A, 15B:
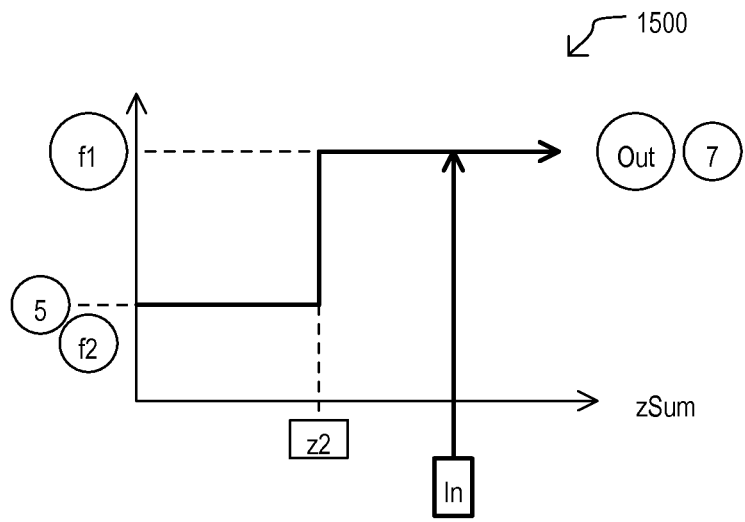
FIGS. 15A and 15B are diagrams showing a finger size calculation for an object at a corner location that can be included in embodiments.

FIGS. 15A and 15B show finger size calculation functions for finger occurrences at a corner position of a sensing area. Such functions can be utilized when an object is first detected (e.g., first touch occurs) at an edge location, so that a finger size has not yet been locked for the corner location.

FIG. 15A is a graphical representation of a function 1500 in which a zSum value can be an input (In) to a finger size function to derive a finger size value (Out) at a corner position. In the very particular embodiment shown, the finger size is a step function. If a zSum value is less than a threshold (z2), a finger size may be set to one value (which may be greater than a minimum size value). In the very particular embodiment shown, this is a 5 mm. If a zSum value is greater than the threshold (z2), a finger size may be set to another, larger value. In the very particular embodiment shown, this is a 7 mm.

FIG. 15B is a pseudocode version of a function 1500' like that of FIG. 15A. As in the case of FIG. 13B-1, other embodiments can calculate a summation (zSum) using a larger number of sensors.

In very particular embodiments, either of functions of FIG. 15A or 15B can be particular implementations of those shown as 332 in FIG. 3 or 432 in FIG. 4.

As noted above, embodiments can include functions that populate virtual sensor values for calculated final edge (and corner) object positions. In particular embodiments, there can be different functions according to how close an object is to an edge (determined with an initial position determination). The closer an object is to an edge, the greater the number of virtual sensor values. Further, in some embodiments, virtual sensor values can vary dynamically according to finger size. Very particular implementations of such a function are shown in FIGS. 16A and 16B.

FIG. 16A shows equations 1600 for a function that can be used to populate virtual sensor values in a first edge case (i.e., an "outer edge"). Equation 6 can calculate a FingerScale value which can use a finger size (FS), a minimum finger size value (MIN_FINGER_OPTIMIZATION), and two scaling values ($2^{SCALAR\_SHFT}$ and $2^{FS\_SHFT}$). Equations 7 and 8 can represent a dynamic response for a scalar value by relying on "pivot" points (HighPivot, LowPivot) for a finger movement response at an edge. Very particular examples of such pivot points were shown in FIGS. 5B-1 to 5B-3.

Equation 9 shows the generation of a ScalarRange value, which incorporates the FingerScale value (and a scaling factor $2^{SCALAR\_SHFT}$), and thus varies according to finger size. Equation 10 shows the generation of a Scalar value which can be applied to vary a gain value used to calculate virtual sensor values. As shown, the Scalar incorporates the high and low pivot points (HighPivot, LowPivot) as well as the FingerScale value (and a scaling factor $2^{SCALAR\_SHFT}$), and thus will vary dynamically according to finger size.

Equation 11 shows the population of virtual sensor values on an edge closest to the actual sensor values (i.e., column 1 of a grid). Such values are generated using the dynamic gain value Scalar, a set gain value (outergain), and a value of an adjacent actual sensor (centroid[2][j]) (as well as two scaling factors $2^{GAIN\_SHFT}$, $2^{SCALAR\_SHFT}$).

Equation 12 shows the population of virtual sensor values on an edge further away from the actual sensor values (i.e., column 0 of the grid). Such values are generated using a set gain value (innergain), and a value of an adjacent virtual sensor (centroid[1][j]) (as well as a scaling factors $2^{GAIN\_SFT}$).

FIG. 16B is a pseudocode version of a function 1600'. Function 1600' can include a section 1674-0 which can calculate values as in Equations 6, 7, 8, 9 of FIG. 16A. In section 1674-1, if a corner flag is set, pivot point values (HighPivot, LowPivot) can be reduced.

Section 1674-2 shows the setting of a dynamic value can be established by comparing a summation value zSum to pivot point values (HighPivot, LowPivot). Section 1674-3 shows the setting of a scalar value, using the dynamic value from section 1674-2, which can adjust gain values of virtual sensors.

Section 1674-4 shows the population of virtual sensor values (along columns 0 and 1 of a grid) using gain values and the scalar value noted above.

In very particular embodiments, either of functions of FIG. 16A or 16B can be particular implementations of those shown as 324 in FIG. 3.

FIGS. 17A and 17B show functions that can be used to populate virtual sensor values in a second edge case (i.e., an "inner edge"). FIG. 17A shows a function 1700 that can calculate virtual sensor values for a column of a grid (centroid[0][j]) using a set gain value (innergain), and a value of an adjacent virtual sensor (centroid[1][j]) (as well as a scaling factors $2^{GAIN\_SHFT}$).

FIG. 17B is a pseudocode version of a function 1700' like that of FIG. 17A. Virtual sensor values (along column 0) can be populated a using a sensor value from the adjacent column, as well as a gain value and scalar value noted above.

In very particular embodiments, either of functions of FIG. 17A or 17B can be particular implementations of that shown as 326 in FIG. 3.

As noted above, embodiments can arrive at a final position by calculations based on a grid of values (which may or may not include virtual sensor values). In particular embodiments, a same final position calculation can be used regardless of whether the initial position is a core positions or an edge position. FIGS. 18A and 18B show a final position calculation function that can be included in embodiments. It is understood that FIGS. 18A/B represent but one particular position calculation function that can be included in embodiments.

FIG. 18A shows equations for a function 1800 that can calculate a final position (Pos) based on a 5×5 grid. However, alternate embodiments can include different grid sizes. Function 1800 can include calculating a weighted sum (WeightedSum) for all locations of a grid. A total sum (TotalSum) can be calculated for all locations of the grid. A resolution value can be established with a resolution number (Resolution), sensor number (SensorNum), and a scaling value ($2^{RES\_SHFT}$).

A final position calculation (i.e., centroid calculation) can then be made using the above values, as well as scaling values (RES_SHIFT, COM_SHIFT).

FIG. 18B shows pseudocode for a function 1800' like that of FIG. 18A.

It is understood that in some embodiments, functions like those of FIGS. 18A/B can be performed twice, once for an X-axis position and once for Y-axis position, with the grid being rotated between such functions.

In very particular embodiments, either of functions of FIGS. 18A and 18B can be particular implementations of those shown as 322 in FIG. 3, 982/984 in FIG. 9B, xPos/yPos in FIGS. 10/12, and 1182-0/1/2, 1184-0/1/2 in FIGS. 11A to 11C As noted above, embodiments can include mirroring operations that can translate sensor values (including virtual sensor values) to provide a common orientation to populate virtual sensor values and/or calculate final object positions. Examples of such functions will now be described. The various functions described below operation on a 5×5 grid of sensor values, but alternate embodiments can include larger or smaller grid sizes, as well as non-rectangular grids.

Figure 19A:
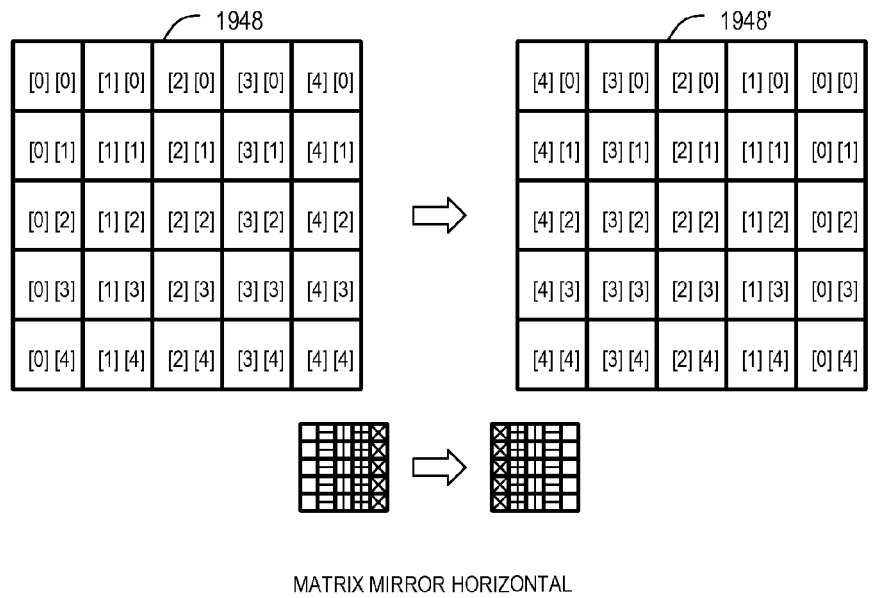
FIGS. 19A to 19C are diagrams showing grid translation functions according to embodiments.

FIG. 19A show shows a horizontal mirroring operation according to one particular embodiment. An initial sensor configuration is shown as 1948, with sensor positions identified by x,y coordinates (i.e., [x][y]). A mirrored sensor configuration is shown as 1948'. As shown, sensors along a right edge have now been translated to a left edge.

In very particular embodiments, the function of FIG. 19A can be a particular implementation of those shown as 766-0/1 of FIGS. 7A/B, as "MatrixMirrorHorizontal" in FIGS. 8/10, and as 966-0/1 in FIGS. 9A/B.

Figure 19B:
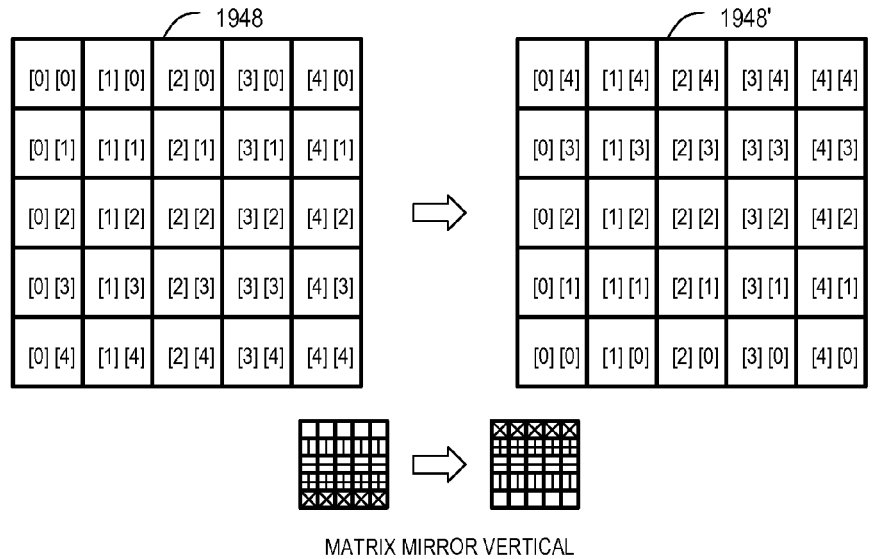

FIG. 19B show shows a vertical mirroring operation according to one particular embodiment. An initial sensor configuration is shown as 1948, with sensor positions identified by x,y coordinates (i.e., [x][y]). A mirrored sensor configuration is shown as 1948'. As shown, sensors along a top edge have now been translated to a bottom edge.

In very particular embodiments, the function of FIG. 19B can be a particular implementation of those shown as 768-0/1 of FIGS. 7A/B, as "MatrixMirrorVertical" in FIGS. 8/10, and as 968-0/1 in FIGS. 9A/B.

Figure 19C:
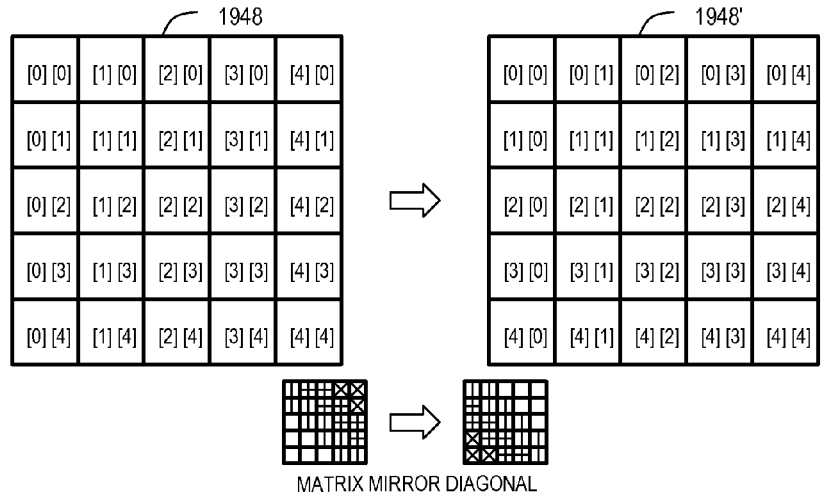

FIG. 19C show shows a diagonal mirroring operation according to one particular embodiment. An initial sensor configuration is shown as 1948, with sensor positions identified by x,y coordinates (i.e., [x][y]). A mirrored sensor configuration is shown as 1948'. As shown, sensors along a top edge have now been translated to a left edge.

In very particular embodiments, the function of FIG. 19C can be a particular implementation of those shown as 772-0/1/2/3 of FIGS. 7A/B, as "MatrixMirrorDiagonal" in FIGS. 8/10/12, as 972-0/1/2/3 in FIGS. 9A/B, and as 1172-0/1/2/3/4/5 in FIGS. 11A/B.

In addition to mirroring operations, embodiments can include other functions such as clearing functions, which can clear sensor values in a particular range, as well as summation functions, which can add up sensor values of a particular range. Very particular implementations of such functions will now be described.

Figures 20A, 20B:
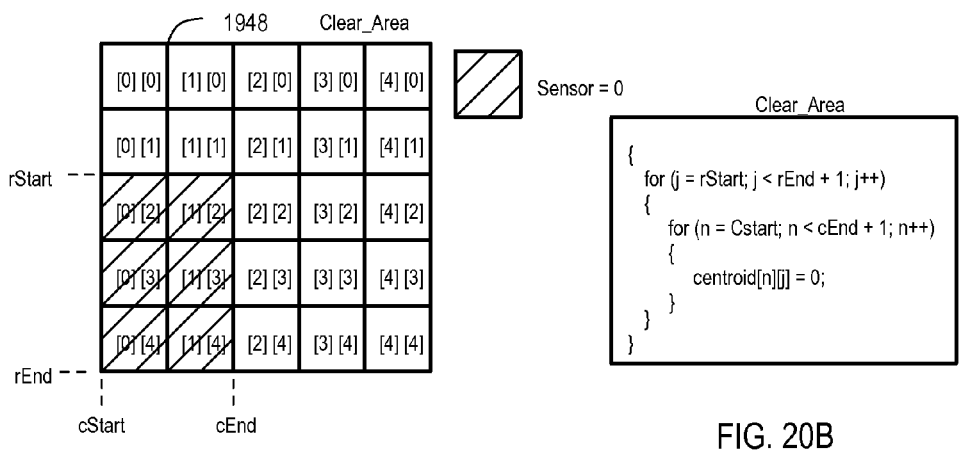
FIGS. 20A and 20B are diagrams showing a sensor clearing function that can be included in embodiments.

FIGS. 20A and 20B show a clear function that can clear values of a grid in a particular range. FIG. 20A is a diagram of a grid 1948 showing how sensors in a range defined by a row start, row end, column start and column end values can be cleared (e.g., set to 0 in this example). It is understood that such sensor values can be actual sensors, virtual sensors or combinations thereof.

FIG. 20B is a pseudocode representation of a function like that of FIG. 20A.

In very particular embodiments, the function of FIGS. 20A/B can be particular implementations of those shown as 978 in FIG. 9A, as "Clear_Area" in FIGS. 10/12, and as 1178-0/1/2/3 in FIGS. 11A/B.

Figures 21A, 21B:
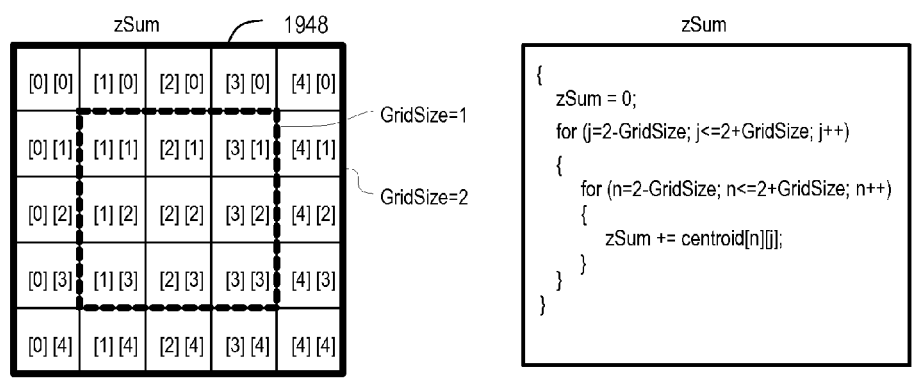
FIGS. 21A and 21B are diagrams showing a sensor summation function that can be included in embodiments.

FIGS. 21A and 21B show a summation function that can generate a summation value for sensors of a grid. In the function shown, summation centers around a central sensor (i.e., Sensor [2][2]). How many sensors are added can depend upon a GridSize value. In FIG. 21A, for one grid size (=1), a 3×3 group around a center sensor can be added. For another grid size (=2), sensors for the entire 5×5 grid can be added. It is understood that such sensor values can be for actual sensors, virtual sensors or combinations thereof.

FIG. 21B is a pseudocode representation of the function of FIG. 21A.

In very particular embodiments, the function of FIGS. 21A/B can be particular implementations of those shown as "zSum" in FIGS. 13A to 15B.

Figure 22:
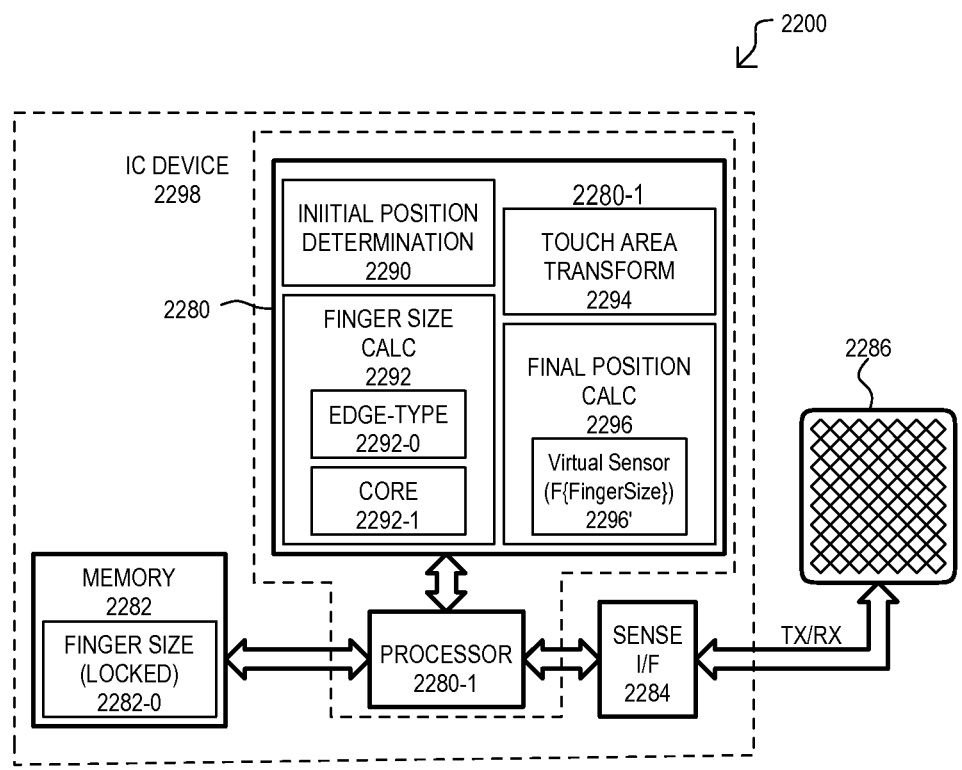
FIG. 22 is a block schematic diagram of a system according to a particular embodiment.

FIG. 22 shows a system 2200 according to another embodiment. In a very particular embodiment, a system 2200 can be one particular implementation of that shown in FIG. 3. System 2200 can include a processing section 2280, a memory section 2282, a sense section 2284, and a capacitance sense network 2286.

A capacitance sense network 2286 can include a number of capacitance sensors that can provide values reflecting the proximity of one or more objects. In the embodiment shown, a capacitance sense network 2286 can be a touch mutual capacitance sensing network that includes transmit (TX) and receive (RX) electrodes, and can generate capacitance values that vary according to the proximity of fingers. In one embodiment, TX and RX electrodes can be perpendicular to one another, with TX electrodes being driven to induce a change on RX electrodes. Such changes can be sensed to detect variations in capacitance, and hence the proximity of an object. A position of the object can be determined based on the TX electrode driven, and the RX electrode exhibiting the change in capacitance.

A sense section 2284 can drive TX electrodes of network 2286 and sense values on RX electrodes. In some embodiments "raw" sense values (e.g., counts) can be provided to processing section 2280. In other embodiments, sense values from network 2286 can be pre-processed before being supplied to a processing section 2280.

A processing section 2280 can include a processor 2280-0 that can execute functions stored instructions 2280-1. Instructions enable a processing section to execute various functions, as described herein, or equivalents. In FIG. 22, instructions can include initial position determination functions 2290, finger size calculation functions 2292, area transform functions 2294, and final position calculation functions 2296. Initial position determination functions can determine a general position of an object (e.g., near edge, near corner, in core). In very particular embodiments, such functions can utilize a local maximum (or minimum) in such a determination. Finger size calculation functions 2292 can include multiple different finger size calculations according to position (i.e., core 2292-0 or edge-type 2292-1). It is understood that edge-type functions can include for initial locations on an edge or corner.

Area transform functions 2294 can allow a set of sensor values to be translated to a common orientation (e.g., aligned along a particular edge), to enable a same function call to populate sensor locations with virtual sensor values, if needed.

Final position calculation function 2296 can determine a final position of an object. Final position calculation function 2296 can include a virtual sensor section, which can generate virtual sensor values for touches occurring on an edge-type location of a sense network 2286. Such virtual sensor values can be function of finger size, and in particular embodiments, can dynamically change according to finger size.

A memory section 2282 can store various data values for a processing section 2280. In the embodiment shown, a memory section 2282 can store a finger size value 2282-0 (e.g., lock a finger size value) to enable such a value to reused in a position calculation at an edge-type location (i.e., a finger size is not re-calculated if already determined).

While memory section 2282 and instructions 2280 may exist in different memories (e.g., one in a volatile memory the other as firmware in a nonvolatile memory), in alternate embodiments such data can occupy different locations in a same memory.

In the particular embodiment shown, a processing section 2280, a memory section 2282, and a sense section 2284 can be parts of a same integrated circuit (IC) device 2298. For example, such sections can be formed in a same IC substrate, or may be formed in a same package (e.g., multi-chip package). In one very particular embodiment, an IC device can be from the PSoC®, CapSense® and/or TrueTouch® family of devices manufactured by Cypress Semiconductor Corporation of San Jose, Calif., U.S.A.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for use in an electronic device including a touch sense network and a touch processing system, comprising:
   in the processing system:
      determining an initial position of an object proximate to a sensing region formed by a plurality of sensors of the sense network and having a core region bounded by at least one edge;
   wherein the processing system is configured to respond to the determining, when the initial position is proximate to the at least one edge and a size of the object was previously calculated, by determining a final edge position of the object using the previously calculated object size, wherein the determining the final edge position includes generating at least one virtual sensor value corresponding to a location that extends beyond the edge, and wherein generating the at least one virtual sensor value includes generating an initial value for a respective virtual sensor based on values of sensors proximate to the edge, and multiplying the initial value by a gain value that varies dynamically according to the determined object size;
   wherein the processing system is configured to respond to the determining, when the initial position is proximate to the at least one edge and the size of the object was not previously calculated, by determining a size of the object; and
   wherein for some initial positions, generating virtual sensor values includes translating positions of sensor values, if necessary, to commonly orient at least one edge of a sensor group and using a same position calculation regardless of the initial position.

2. The method of claim 1, wherein:
   the sensors are capacitive sensors; and
   the determined object sizes range from about 3 millimeters to 10 millimeters.

3. The method of claim 1, wherein:
   determining the size of the object when the initial position is proximate to the at least one edge includes executing first calculations; and further comprising:
   when the initial position is within the core region and the size of the object was not previously calculated, determining a size of the object by executing second calculations different than the first calculations.

4. A method for use in an electronic device including a touch sense network and a touch processing system, comprising:
   in the touch processing system:
      determining an initial position of an object proximate to a sensing region formed by a plurality of sensors of the sense network and having a core region bounded by at least one edge;
      wherein the touch processing system is configured to respond to the determining, when the object is proximate to the at least one edge, by determining a final position of the object by generating values for virtual sensors that extend beyond the edge, the values for virtual sensors being based on a determined object size, wherein generating the values for virtual sensors includes generating an initial value for a respective virtual sensor based on values of sensors proximate to the edge, and multiplying the initial value by a gain value that varies dynamically according to the determined object size;
   wherein the touch processing system is configured to respond to the determining, when the initial position is not proximate to the at least one edge, by determining a final position of the object using a centroid of sensors from the core region; and
   wherein determining an initial position of the object includes determining a maximum value of a sensor in a group of sensors, and determining if the sensor having the maximum value is within a predetermined range of the edge.

5. The method of claim 4, wherein:
   determining the initial position includes capacitance sensing with each sensor; and
   the determined object size ranges from about 3 mm to about 10 mm.

6. The method of claim 4, wherein:
   determining a final position of the object includes acquiring sensor values for a first portion of a grid, generating virtual sensor values for the remaining portion of the grid from the sensor values of the first portion, the virtual sensor values varying according to the determined object size, and
   calculating a position from the acquired sensor values and generated virtual sensor values.

7. The method of claim 4, further including:
   if a size of the object proximate to the at least one edge was previously determined, determining a final edge position of the object using the previously determined object size;
   if a size of the object proximate to the at least one edge was not previously determined, determining a size of the object with first operations; and
   if the object is within the core region and the size of the object was not previously determined, determining a size of the object with second operations different than the first operations.

8. The method of claim 4, further including:
   translating positions of sensor values, if necessary, to commonly orient at least one edge and use a same position calculation regardless of object location; wherein if the initial position is within the core, the position calculation does not include virtual sensor values, and
   if the initial position is proximate to an edge, the position calculation includes virtual sensor values.

9. A system, comprising:
a sense section configured to receive object position data corresponding to sensors forming a sense area having a core region bounded by at least one edge;
an object size determination section configured to determine and store an object size when the object is initially detected;
a position calculation section configured to:
   determine if an object is proximate an edge of the sense area,
   generate virtual sensor values for regions that extend beyond the edge, the virtual sensor values varying according to object size, and
   calculate a final edge position of the object using a stored object size if previously determined, or newly determine an object size if the object is initially detected proximate to the edge.

10. The system of claim 9, further including: a capacitance sensing array coupled to the sense section.

11. The system of claim 10, wherein:
the capacitance sensing system comprises sensors arranged into transmit lines and receive lines.

12. The system of claim 9, wherein:
the position calculation section is configured to generate an initial value for each virtual sensor based on values of sensors proximate the edge, and
multiply the initial values by a gain value that varies dynamically according to object size.

13. The system of claim 9, wherein:
the object size determination section is configured to determine object sizes differently for objects detected proximate to the edge as compared to objects detected in the core region.

14. A method, performed by a touch processing system, comprising:
determining an initial position of an object with respect to a sensing region formed by a plurality of sensors and having a core region bounded by at least one edge;
wherein the touch processing system is configured to, when the initial position is proximate to the edge and a size of the object was previously calculated, determine a final edge position of the object using the previously calculated object size;
wherein the touch processing system is configured to, when the initial position is proximate to the edge and the size of the object was not previously calculated, determine a size of the object;
wherein the touch processing system is configured to calculate the size of the object using an edge maximum finger limit and an edge minimum finger limit when no size of the object was previously calculated and the initial position is proximate to the edge;
wherein the touch processing system is configured to calculate the size of the object using a core maximum finger limit and a core minimum finger limit when no size of the object was previously calculated and the initial position is within the core region; and
wherein the edge maximum finger limit is less than the core maximum finger limit and the edge minimum finger limit is less than the core minimum finger limit.

* * * * *